US012014716B2

(12) United States Patent
Qin et al.

(10) Patent No.: US 12,014,716 B2
(45) Date of Patent: Jun. 18, 2024

(54) METHOD FOR REDUCING OCCLUSION EFFECT OF EARPHONE, AND RELATED APPARATUS

(71) Applicant: HUAWEI TECHNOLOGIES CO., LTD., GuangDong (CN)

(72) Inventors: Jingfan Qin, Shenzhen (CN); Fan Fan, Shenzhen (CN); Yulong Li, Shenzhen (CN); Xiaowei Yu, Shenzhen (CN); Xiaohong Yang, Shenzhen (CN); Yangshan Ou, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 153 days.

(21) Appl. No.: 17/853,471

(22) Filed: Jun. 29, 2022

(65) Prior Publication Data

US 2022/0335924 A1 Oct. 20, 2022

Related U.S. Application Data

(63) Continuation of application No. PCT/CN2020/112218, filed on Aug. 28, 2020.

(30) Foreign Application Priority Data

Dec. 31, 2019 (CN) ........................ 201911419855.7

(51) Int. Cl.
*G10K 11/178* (2006.01)
*G10L 25/78* (2013.01)
(Continued)

(52) U.S. Cl.
CPC .. *G10K 11/17827* (2018.01); *G10K 11/17823* (2018.01); *G10K 11/17825* (2018.01);
(Continued)

(58) Field of Classification Search
CPC ...... H04R 1/1083; H04R 1/406; H04R 3/005; H04R 2460/01; H04R 2460/13;
(Continued)

(56) References Cited

U.S. PATENT DOCUMENTS 8,073,150 B2 * 12/2011 Joho .................. G10K 11/1783
381/71.6
2005/0123146 A1 6/2005 Voix et al.
(Continued)

FOREIGN PATENT DOCUMENTS

CN 102170606 A 8/2011
CN 104871559 A 8/2015
(Continued)

*Primary Examiner* — Tuan D Nguyen
(74) *Attorney, Agent, or Firm* — Rimon PC

(57) ABSTRACT

This application discloses a method for reducing an occlusion effect of an earphone, and a related apparatus. The method is applied to an earphone having at least one microphone and a speaker. The method includes: detecting an occurrence of at least one of the following events: a user speaks and the user is in motion; and triggering at least one of the following operations in response to the at least one event: processing the user's sound signal based on the at least one microphone to suppress an occlusion effect of the earphone, and playing an audio by using the speaker, to mask a sound signal in the user's auditory canal. Embodiments of this application can reduce or even eliminate the earphone occlusion effect, to improve user experience.

20 Claims, 20 Drawing Sheets

(51) Int. Cl.
*H04R 1/10* (2006.01)
*H04R 1/40* (2006.01)
*H04R 3/00* (2006.01)

(52) U.S. Cl.
CPC .. *G10K 11/17854* (2018.01); *G10K 11/17881* (2018.01); *G10L 25/78* (2013.01); *H04R 1/1083* (2013.01); *H04R 1/406* (2013.01); *H04R 3/005* (2013.01); *G10K 2210/1081* (2013.01); *G10K 2210/3026* (2013.01); *G10K 2210/3027* (2013.01); *G10K 2210/3028* (2013.01); *G10K 2210/3044* (2013.01); *G10K 2210/3056* (2013.01); *H04R 2460/01* (2013.01); *H04R 2460/13* (2013.01)

(58) Field of Classification Search
CPC ............ H04R 2410/05; H04R 2460/05; G10K 11/17827; G10K 11/17823; G10K 11/17825; G10K 11/17854; G10K 11/17881; G10K 2210/1081; G10K 2210/3026; G10K 2210/3027; G10K 2210/3028; G10K 2210/3044; G10K 2210/3056; G10K 11/17885; G10K 11/178; G10L 25/78; G10L 19/012; G10L 2021/02166
See application file for complete search history.

(56) References Cited

U.S. PATENT DOCUMENTS

| | | | |
|---|---|---|---|
| 2014/0348360 | A1 | 11/2014 | Gran |
| 2017/0171679 | A1 | 6/2017 | Isberg et al. |
| 2018/0033420 | A1 | 2/2018 | Song et al. |

FOREIGN PATENT DOCUMENTS

| | | | |
|---|---|---|---|
| CN | 104918177 | A | 9/2015 |
| CN | 105052170 | A | 11/2015 |
| CN | 106888414 | A | 6/2017 |
| CN | 107615775 | B | 2/2020 |
| WO | 2012120295 | A1 | 9/2012 |

* cited by examiner

METHOD FOR REDUCING OCCLUSION EFFECT OF EARPHONE, AND RELATED APPARATUS

CROSS-REFERENCE TO RELATED APPLICATIONS

This application is a continuation of International Application No. PCT/CN2020/112218, filed on Aug. 28, 2020, which claims priority to Chinese Patent Application No. 201911419855.7, filed on Dec. 31, 2019. The disclosures of the aforementioned applications are hereby incorporated by reference in their entireties.

TECHNICAL FIELD

This application relates to the field of electronic device technologies, and in particular, to a method for reducing an occlusion effect of an earphone, and a related apparatus.

BACKGROUND

Nowadays, with development of electronic technologies, there are more types and functions of earphones. For example, the types of earphones include in-ear earphones, semi-in-ear earphones, over-ear earphones, and ear-mounted earphones. A semi-in-ear earphone or an in-ear earphone may be further equipped with an eartip, so that the earphone can fit in well with a human ear after being inserted in the ear, thereby better physically isolating ambient noise.

Generally, there is an occlusion effect, also referred to as a stethoscope effect or an ear blocking effect, in every in-ear earphone, semi-in-ear earphone with an eartip, and over-ear earphone. The occlusion effect is a phenomenon in which a bone conduction hearing threshold decreases after an external auditory canal orifice is blocked by an earphone. It usually occurs at a sound frequency below 1 kHz. Skull vibration transferred to an external auditory canal causes relative movement of air in the external auditory canal, and due to blockage of the external auditory canal orifice, the air cannot be disseminated but is totally transferred to an internal ear through a middle ear, resulting in a low bone conduction hearing threshold.

When a user wearing the earphone speaks, because of the occlusion effect, the user wearing the earphone may feel that words spoken by the user are dull, unnatural, and inaudible, and sound like an echo. In addition, when the earphone is in a state of being worn by the user, the earphone vibrates, an earphone wire shakes, the user's head turns, or the earphone vibrates due to external collision or friction when the user wearing the earphone moves. The vibration is further transferred to the auditory canal, and sound generated by the vibration is reflected to a tympanic membrane in a closed auditory canal space. This may cause a 20 dB or more increase in low frequency components below 500 Hz, resulting in an occlusion effect that makes the user uncomfortable to hear.

How to reduce or even eliminate the occlusion effect of the earphone is still a technical problem to be resolved urgently.

SUMMARY

This application provide a method for reducing an occlusion effect of an earphone, and a related apparatus, to reduce or even eliminate the earphone occlusion effect and improve user experience.

According to a first aspect, an embodiment of this application provides a method for reducing an occlusion effect of an earphone. The method is applied to an earphone having at least one microphone and a speaker. The method includes: detecting occurrence of at least one of the following events: a user speaks and the user is in a motion state; and triggering at least one of the following operations in response to the at least one event: processing the user's sound signal based on the at least one microphone to suppress an occlusion effect of the earphone, and playing an audio by using the speaker, to mask a sound signal in the user's auditory canal.

It can be learned that, in this embodiment of this application, when the earphone detects, by using a sensor, that the user is in the motion state, or detects, by using the at least one microphone, that the user speaks, an occlusion effect reduction or elimination (OR) procedure may be initiated. Hardware in the earphone is fully used to process the user's sound signal based on one or more microphones to suppress the occlusion effect of the earphone, and/or the audio is played by using the speaker, to mask the sound signal in the user's auditory canal. This can greatly reduce or even eliminate the occlusion effect generated when the user speaks or the user moves. In this way, the user can hear the user's own sound more realistically and naturally without distortion, and discomfort caused by friction of the earphone or vibration of an earphone wire due to motion of the user is eliminated, and user experience is improved.

Based on the first aspect, in a possible embodiment, the at least one microphone includes a reference microphone (reference mic); and the processing a sound signal based on the at least one microphone to suppress an occlusion effect of the earphone includes: capturing, by using the reference microphone, the user's sound signal propagated in the air; and processing, by using a feedforward filter, the sound signal captured by the reference microphone, to obtain a to-be-compensated sound signal, and playing the to-be-compensated sound signal by using the speaker, to transparently transmit the sound signal to the user's auditory canal.

In other words, the user's sound signal propagated in the air may be captured by using the reference microphone; the sound signal captured by the reference microphone is processed by using the feedforward filter (FF filter), to obtain the to-be-compensated sound signal, and the to-be-compensated sound signal is played by using the speaker; and the to-be-compensated sound signal is combined with sound leaked into the auditory canal through a gap between the earphone and an ear. Therefore, the user's voice can be reproduced, that is, the user's sound signal can be transparently transmitted to the user's auditory canal. In this way, the sound signal propagated in the air is enhanced, and the occlusion effect of the earphone is reduced or even eliminated.

Based on the first aspect, in a possible embodiment, the at least one microphone includes a main microphone (main mic); and the processing a sound signal based on the at least one microphone to suppress an occlusion effect of the earphone includes: capturing, by using the main microphone, the user's sound signal propagated in the air; and processing the sound signal captured by the main microphone, to obtain a to-be-compensated sound signal, and playing the to-be-compensated sound signal by using the speaker, to transparently transmit the sound signal to the user's auditory canal.

In other words, in this embodiment of this application, the user's sound signal propagated in the air may be captured by using the reference microphone, and processing is performed to obtain the to-be-compensated sound signal. When the user speaks, a small portion of the sound signal propagated in the air is propagated to the user's auditory canal through a gap between the earphone and the auditory canal or a gap in another form, and the small portion of the sound signal is superimposed on the to-be-compensated signal played by using the speaker. In this way, the user's sound signal in the air propagation path can also be enhanced to some extent, an effect similar to transparently transmitting the sound signal to the user's auditory canal is achieved, and the occlusion effect of the earphone is reduced or even eliminated.

Based on the first aspect, in a possible embodiment, the at least one microphone includes an error microphone (error mic); and the processing a sound signal based on the at least one microphone to suppress an occlusion effect of the earphone includes: capturing, by using the error microphone, the sound signal propagated in the user's auditory canal; and processing, by using a feedback filter, the sound signal captured by the error microphone, to obtain anti-noise signal, and playing the anti-noise signal by using the speaker, where the anti-noise signal is used to weaken or cancel the sound signal captured by the error microphone.

It can be learned that, in this embodiment of this application, the sound signal propagated in the user's auditory canal may be captured by using the error microphone. In a scenario in which the user speaks, the sound signal propagated in the user's auditory canal may be caused by the user's sound signal propagated by bone conduction. In a scenario in which the user moves, the sound signal propagated in the user's auditory canal may be caused by friction of the earphone or vibration of the earphone wire due to motion of the user. Then the sound signal captured by the error microphone may be processed by using the feedback filter (FB filter), to obtain the anti-noise signal, where the anti-noise signal is comparable in amplitude and opposite in phase to the sound signal in the user's auditory canal. Therefore, when the anti-noise signal is played by using the speaker, the anti-noise signal can weaken or cancel the sound signal in the user's auditory canal, the sound signal propagated by bone conduction or the sound signal caused by vibration of the earphone is weakened, and the occlusion effect of the earphone is reduced or even eliminated.

Based on the first aspect, in a possible embodiment, the playing an audio by using the speaker, to mask a sound signal in the user's auditory canal includes: playing preset-level comfort noise by using the speaker, where the comfort noise is used to mask the sound signal propagated in the user's auditory canal.

In other words, in this embodiment of this application, according to a principle of a masking effect, the preset-level comfort noise may be played by using the speaker, to mask the sound signal in the user's auditory canal. In this way, the occlusion effect of the earphone is reduced or even eliminated. The sound signal propagated in the user's auditory canal may be, for example, a sound signal propagated to the user's auditory canal by bone conduction when the user speaks, or may be, for example, noise caused by friction of the earphone or vibration of the earphone wire due to motion of the user. In this embodiment of this application, the masking effect is to mask the sound signal in the user's auditory canal by stimulating an auditory sensation of the user by using the preset-level comfort noise, to weaken or even eliminate the user's perception of the sound signal.

Based on the first aspect, in a possible embodiment, the playing an audio by using the speaker, to mask a sound signal in the user's auditory canal includes: adjusting volume of a played downlink audio signal, and playing the downlink audio signal by using the speaker, where the played downlink audio signal is used to mask the sound signal propagated in the user's auditory canal.

In other words, in this embodiment of this application, according to the principle of the masking effect, the played downlink audio signal with the preset volume is played by using the speaker, to mask the sound signal in the user's auditory canal. In this way, the occlusion effect of the earphone is reduced or even eliminated. The sound signal propagated in the user's auditory canal may be, for example, a sound signal propagated to the user's auditory canal by bone conduction when the user speaks, or may be, for example, noise caused by friction of the earphone or vibration of the earphone wire due to motion of the user. In this embodiment of this application, the masking effect is to mask the sound signal in the user's auditory canal by stimulating the auditory sensation of the user by using the played downlink audio signal, to weaken or even eliminate the user's perception of the sound signal.

Based on the first aspect, in a possible embodiment, the sound signal propagated in the user's auditory canal is caused by the user's sound signal propagated by bone conduction, that is, a sound signal propagated to the auditory canal by bone conduction when the user speaks.

Based on the first aspect, in a possible embodiment, the sound signal propagated in the user's auditory canal is caused by friction of the earphone or vibration of the earphone wire due to motion of the user. For example, the sound signal propagated in the user's auditory canal may be noise in the auditory canal, caused by vibration of the earphone, shaking of the earphone wire, head turning, or vibration of the earphone generated by external collision or friction when the user wearing the earphone moves.

Based on the first aspect, in a possible embodiment, when the at least one microphone includes at least one of the reference microphone, the main microphone, or the error microphone, the detecting occurrence of an event that a user speaks includes: recognizing, by using a voice activity detection VAD algorithm, the sound signal captured by at least one of the reference microphone, the main microphone, or the error microphone; and determining, based on a result of recognition, occurrence of the event that the user speaks.

Voice activity detection (VAD) is also referred to as voice endpoint detection or voice boundary detection. The VAD can recognize a silence period in the user's speech from a voice signal stream, and generate and transmit the user's sound signal only when a sudden active voice is detected. Therefore, whether the event that the user speaks occurs can be determined based on a result of recognition by the VAD.

Based on the first aspect, in a possible embodiment, when the at least one microphone includes the reference microphone and the main microphone, the detecting occurrence of an event that a user speaks includes: performing beamforming by using the reference microphone and the main microphone, so that a beam points to the user's mouth; recognizing, by using a voice activity detection VAD algorithm, the sound signals captured by the reference microphone and the main microphone; and determining, based on a result of recognition, occurrence of the event that the user speaks.

For example, when a VAD output is 1, it is determined that the user wearing the earphone speaks. When a VAD output is not 1, it is determined that the user wearing the earphone does not speak.

Based on the first aspect, in a possible embodiment, the detecting occurrence of an event that the user is in a motion state includes: determining, by using a proximity sensor, that the earphone is in a state of being worn by the user; and further determining, by using a motion sensor, that the user is in the motion state.

When the user wears the earphone, the occlusion effect usually occurs in a scenario in which the user speaks or a scenario in which the earphone vibrates due to motion of the user. In an embodiment, to eliminate the occlusion effect in a scenario in which the user moves, the motion sensor and the proximity sensor may be used to detect whether the user is in the motion state; and when it is detected that the user is in the motion state, a corresponding OR operation is initiated. Specifically, it may be first determined, based on data captured by the proximity sensor, that the earphone is in the state of being worn by the user, and then it is further determined, based on data captured by the motion sensor, whether the user is in the motion state.

Based on the first aspect, in a possible embodiment, the at least one microphone includes a reference microphone and an error microphone;

before the triggering, in response to the at least one event, processing the user's sound signal based on the at least one microphone to suppress an occlusion effect of the earphone, the method further includes: determining a filter coefficient combination from a filter coefficient library based on a received or determined level index used to indicate a degree of occlusion effect reduction, where the filter coefficient combination includes a coefficient of a feedforward filter and a coefficient of a feedback filter, and the level index corresponds to the filter coefficient combination in the filter coefficient library; and correspondingly, the triggering, in response to the at least one event, processing the user's sound signal based on the at least one microphone to suppress an occlusion effect of the earphone specifically includes: capturing, by using the reference microphone, the user's sound signal propagated in the air; and processing, by using the feedforward filter based on the coefficient of the feedforward filter, the sound signal captured by the reference microphone, to obtain a to-be-compensated sound signal, and playing the to-be-compensated sound signal by using the speaker, to transparently transmit the sound signal to the user's auditory canal; and capturing, by using the error microphone, the sound signal propagated in the user's auditory canal; and processing, by using the feedback filter based on the coefficient of the feedback filter, the sound signal captured by the error microphone, to obtain anti-noise signal, and playing the anti-noise signal by using the speaker, where the anti-noise signal is used to weaken or cancel the sound signal captured by the error microphone.

Based on the first aspect, in a possible embodiment, before the triggering, in response to the at least one event, playing an audio by using the speaker, to mask a sound signal in the user's auditory canal, the method further includes: determining a preset level of comfort noise or determining preset volume of a played downlink audio signal based on a received or determined level index used to indicate a degree of occlusion effect reduction, where the level index corresponds to the preset level or the preset volume; and correspondingly, the playing an audio by using the speaker, to mask a sound signal in the user's auditory canal specifically includes:

playing the preset-level comfort noise by using the speaker, where the comfort noise is used to mask the sound signal propagated in the user's auditory canal; or playing the played downlink audio signal with the preset volume by using the speaker, where the played downlink audio signal is used to mask the sound signal propagated in the user's auditory canal.

Based on the first aspect, in a possible embodiment, the level index is related to a degree of matching between the earphone and the user's auditory canal. The level index may be set by the user through an input interface.

In other words, in this embodiment of this application, the user may control, by using an application (APP) on an intelligent mobile terminal (for example, a mobile phone or a tablet computer), enabling or disabling of an OR function, and set, by using the APP, the level index used to indicate the degree of occlusion effect reduction. For example, the user may select, by using a related control for adjusting the level index on the APP, a level index suitable for the user's auditory canal, and transmit the level index to a communication interface on an earphone side by using a Bluetooth link, so that the earphone obtains an optimal OR effect.

After obtaining the level index, a main control unit (MCU) in the earphone may start OR in one or more of the following manners:

(1) The main control unit selects an appropriate FF filter coefficient and/or FB filter coefficient from the filter coefficient library in a memory based on the level index, and writes the filter coefficient to the FF filter and/or FB filter in a signal processing unit, so that the solution to processing the user's sound signal based on the microphone to suppress the occlusion effect of the earphone is subsequently performed to obtain the OR effect in the level index. A binding relationship exists between the level index and the FF filter coefficient and/or the FB filter coefficient.

(2) The main control unit adjusts the volume of the downlink audio signal and/or adjusts the level of the comfort noise based on the level index, so that the solution to suppressing the occlusion effect of the earphone based on the masking effect generated by the speaker is subsequently performed to obtain the OR effect in the level index. A binding relationship exists between the level index and the volume of the downlink audio signal and/or the level of the comfort noise.

According to a second aspect, an embodiment of this application provides a method for controlling an earphone. The method may be applied to a terminal. The method includes: displaying an input interface, and providing a control switch component and a level index adjustment component on the input interface; receiving a switch control signal by using the control switch component, where the switch control signal is a setting signal for enabling or disabling an earphone occlusion effect reduction function by a user; and receiving the user's setting of a level index by using the level index adjustment component, where the level index is used to indicate a degree of occlusion effect reduction.

For example, the control switch component may be a switch control module, and the switch control module includes two positions: "OFF" and "ON". Optionally, identifiers of the positions may alternatively be in Chinese. For example, the two positions "OFF" and "ON" are included. When the switch control module is set to "OFF" or "OFF", the OR function of the earphone is disabled. When the switch control module is set to "ON" or "ON", the OR function of the earphone is enabled. The level index adjustment component may be a level index adjustment control, and an indication of the level index adjustment control is a symbol or a graph displayed on a control interface. For example, the level index adjustment control may include an adjustment bar for touch control by the user, and the adjustment bar may move within a level index range based on the touch control by the user. The level index range may further include, for example, text symbols "strong" and "weak", or an Arabic digit symbol used to indicate a value of a corresponding level index. The user may set the level index of OR by dragging a location of the adjustment bar within the level index range. When the user stops dragging, an APP records the location of the adjustment bar, obtains a level index value corresponding to the location, and transmits the level index to the earphone by using Bluetooth or another wireless link.

Based on the second aspect, in a possible embodiment, when the switch control signal is the setting signal for enabling or disabling the earphone occlusion effect reduction function by the user, the method further includes:

- sending, to the earphone, indication information used to indicate the level index, so that the earphone configures at least one of the following parameters corresponding to the level index: a filter coefficient combination, a preset level of comfort noise, or preset volume of a played downlink audio signal, where the filter coefficient combination includes a coefficient of a feedforward filter and a coefficient of a feedback filter; the coefficient of the feedforward filter is used to process a sound signal captured by a reference microphone to obtain a to-be-compensated sound signal and play the to-be-compensated sound signal, to transparently transmit a sound signal propagated in the air to the user's auditory canal; the coefficient of the feedback filter is used to process a sound signal captured by an error microphone to obtain anti-noise signal and play the anti-noise signal, to weaken or cancel the sound signal captured by the error microphone; the preset-level comfort noise is used to mask the sound signal propagated in the user's auditory canal; and the played downlink audio signal with the preset volume is used to mask the sound signal propagated in the user's auditory canal.

According to a third aspect, an embodiment of this application provides an apparatus for reducing an occlusion effect of an earphone. The apparatus includes at least one microphone, a speaker, a main control unit, and a signal processing unit. The main control unit is configured to detect occurrence of at least one of the following events: a user speaks and the user is in a motion state. The signal processing unit is configured to trigger at least one of the following operations in response to the at least one event: processing the user's sound signal based on the at least one microphone to suppress an occlusion effect of the earphone, and playing an audio by using the speaker, to mask a sound signal in the user's auditory canal. Components of the apparatus may be configured to implement the method described in the first aspect.

Based on the third aspect, in a possible embodiment, the at least one microphone includes a reference microphone (reference mic); the reference microphone is configured to capture the user's sound signal propagated in the air; the signal processing unit is configured to process, by using a feedforward filter, the sound signal captured by the reference microphone, to obtain a to-be-compensated sound signal; and the speaker is configured to play the to-be-compensated sound signal to transparently transmit the sound signal to the user's auditory canal.

Based on the third aspect, in a possible embodiment, the at least one microphone includes a main microphone (main mic); the main microphone is configured to capture the user's sound signal propagated in the air; the signal processing unit is configured to process the sound signal captured by the main microphone, to obtain a to-be-compensated sound signal; and the speaker is configured to play the to-be-compensated sound signal to transparently transmit the sound signal to the user's auditory canal.

Based on the third aspect, in a possible embodiment, the at least one microphone includes an error microphone (error mic); the error microphone is configured to capture the sound signal propagated in the user's auditory canal; the signal processing unit is configured to process, by using a feedback filter, the sound signal captured by the error microphone, to obtain anti-noise signal; and the speaker is configured to play the anti-noise signal, where the anti-noise signal is used to weaken or cancel the sound signal captured by the error microphone.

Based on the third aspect, in a possible embodiment, the signal processing unit is configured to obtain preset-level comfort noise; and the speaker is configured to play the preset-level comfort noise, where the comfort noise is used to mask the sound signal propagated in the user's auditory canal.

Based on the third aspect, in a possible embodiment, the signal processing unit is configured to adjust volume of a played downlink audio signal; and the speaker is configured to play the played downlink audio signal, where the played downlink audio signal is used to mask the sound signal propagated in the user's auditory canal.

Based on the third aspect, in a possible embodiment, the sound signal propagated in the user's auditory canal is caused by the user's sound signal propagated by bone conduction.

Based on the third aspect, in a possible embodiment, the sound signal propagated in the user's auditory canal is caused by friction of the earphone or vibration of an earphone wire due to motion of the user.

Based on the third aspect, in a possible embodiment, the at least one microphone includes at least one of the reference microphone, the main microphone, or the error microphone; and the main control unit is configured to recognize, by using a voice activity detection VAD algorithm, the sound signal captured by at least one of the reference microphone, the main microphone, or the error microphone; and determine, based on a result of recognition, occurrence of the event that the user speaks.

Based on the third aspect, in a possible embodiment, the at least one microphone includes the reference microphone and the main microphone; and

- the main control unit is configured to perform beamforming by using the reference microphone and the main microphone, so that a beam points to the user's mouth; recognize, by using a voice activity detection VAD algorithm, the sound signals captured by the reference microphone and the main microphone; and determine, based on a result of recognition, occurrence of the event that the user speaks.

Based on the third aspect, in a possible embodiment, the apparatus further includes a proximity sensor and a motion sensor, where the proximity sensor is configured to determine that the earphone is in a state of being worn by the user; and the motion sensor is configured to determine that the user is in the motion state.

Based on the third aspect, in a possible embodiment, the at least one microphone includes a reference microphone and an error microphone; the main control unit is configured to determine a filter coefficient combination from a filter coefficient library based on a received or determined level index used to indicate a degree of occlusion effect reduction, where the filter coefficient combination includes a coefficient of a feedforward filter and a coefficient of a feedback filter, and the level index corresponds to the filter coefficient combination in the filter coefficient library; the reference microphone is configured to capture the user's sound signal propagated in the air; the signal processing unit is configured to process, by using the feedforward filter based on the coefficient of the feedforward filter, the sound signal captured by the reference microphone, to obtain a to-be-compensated sound signal; the speaker is configured to play the to-be-compensated sound signal to transparently transmit the sound signal to the user's auditory canal; the error microphone is configured to capture the sound signal propagated in the user's auditory canal; the signal processing unit is configured to process, by using the feedback filter based on the coefficient of the feedback filter, the sound signal captured by the error microphone, to obtain anti-noise signal; and the speaker is configured to play the anti-noise signal, where the anti-noise signal is used to weaken or cancel the sound signal captured by the error microphone.

Based on the third aspect, in a possible embodiment, the main control unit is configured to determine a preset level of comfort noise or determine preset volume of a played downlink audio signal based on a received or determined level index used to indicate a degree of occlusion effect reduction, where the level index corresponds to the preset level or the preset volume; and the speaker is configured to play the preset-level comfort noise, where the comfort noise is used to mask the sound signal propagated in the user's auditory canal; or play the played downlink audio signal with the preset volume, where the played downlink audio signal is used to mask the sound signal propagated in the user's auditory canal.

Based on the third aspect, in a possible embodiment, the level index is related to a degree of matching between the earphone and the user's auditory canal.

Based on the third aspect, in a possible embodiment, the level index is set by the user through an input interface.

According to a fourth aspect, an embodiment of this application provides an apparatus for controlling an earphone. The apparatus includes a display screen and a user interface. The display screen is configured to display an input interface, and provide a control switch component and a level index adjustment component on the input interface; and further configured to receive a switch control signal by using the control switch component, where the switch control signal is a setting signal for enabling or disabling an earphone occlusion effect reduction function by a user; and receive the user's setting of a level index by using the level index adjustment component, where the level index is used to indicate a degree of occlusion effect reduction.

Based on the fourth aspect, in a possible embodiment, the apparatus further includes a communication interface. The communication interface is configured to: when the switch control signal is the setting signal for enabling or disabling the earphone occlusion effect reduction function by the user, send, to the earphone, indication information used to indicate the level index, so that the earphone configures at least one of the following parameters corresponding to the level index: a filter coefficient combination, a preset level of comfort noise, or preset volume of a played downlink audio signal, where the filter coefficient combination includes a coefficient of a feedforward filter and a coefficient of a feedback filter; the coefficient of the feedforward filter is used to process a sound signal captured by a reference microphone to obtain a to-be-compensated sound signal and play the to-be-compensated sound signal, to transparently transmit a sound signal propagated in the air to the user's auditory canal; the coefficient of the feedback filter is used to process a sound signal captured by an error microphone to obtain anti-noise signal and play the anti-noise signal, to weaken or cancel the sound signal captured by the error microphone; the preset-level comfort noise is used to mask the sound signal propagated in the user's auditory canal; and the played downlink audio signal with the preset volume is used to mask the sound signal propagated in the user's auditory canal.

According to a fifth aspect, an embodiment of this application provides a chip, where the chip includes a processor and a data interface, and the processor reads, by using the data interface, instructions stored in a memory, to perform the method in any one of the first aspect or the possible embodiments of the first aspect.

Optionally, in an implementation, the chip may further include the memory, the memory stores the instructions, the processor is configured to execute the instructions stored in the memory, and when the instructions are executed, the processor is configured to perform the method in any one of the first aspect or the possible embodiments of the first aspect.

According to a sixth aspect, an embodiment of this application provides a chip, where the chip includes a processor and a data interface, and the processor reads, by using the data interface, instructions stored in a memory, to perform the method in any one of the second aspect or the possible embodiments of the second aspect.

Optionally, in an implementation, the chip may further include the memory, the memory stores the instructions, the processor is configured to execute the instructions stored in the memory, and when the instructions are executed, the processor is configured to perform the method in any one of the second aspect or the possible embodiments of the second aspect.

According to a seventh aspect, an embodiment of this application provides a computer-readable storage medium, where the computer-readable medium stores program code executable by an electronic device, and the program code includes instructions used to perform the method in any one of the possible implementations of the first aspect or the second aspect. The electronic device may be an earphone or a terminal device.

According to an eighth aspect, an embodiment of this application provides a computer program product, where the computer program product may be a software installation package, the computer program product includes program instructions, and when the computer program product is executed by an electronic device, a processor of the electronic device performs the method in any one of the embodiments of the first aspect or the second aspect. The electronic device may be an earphone or a terminal device.

It can be learned that, in the embodiments of this application, when the earphone detects, by using a sensor, that the user is in the motion state, or detects, by using the at least one microphone, that the user speaks, an OR procedure may be initiated. Hardware in the earphone is fully used to process the user's sound signal based on one or more microphones to suppress the occlusion effect of the earphone, and/or the audio is played by using the speaker, to mask the sound signal in the user's auditory canal. This can greatly reduce or even eliminate the occlusion effect generated when the user speaks or the user moves. In this way, the user can hear the user's own sound more realistically and naturally without distortion, discomfort caused by friction of the earphone or vibration of the earphone wire due to motion of the user is eliminated, and user experience is improved.

BRIEF DESCRIPTION OF DRAWINGS

To describe the technical solutions in embodiments of this application or in the conventional technology more clearly, the following briefly describes the accompanying drawings for describing the embodiments or the conventional technology.

DESCRIPTION OF EMBODIMENTS

Figure 1:
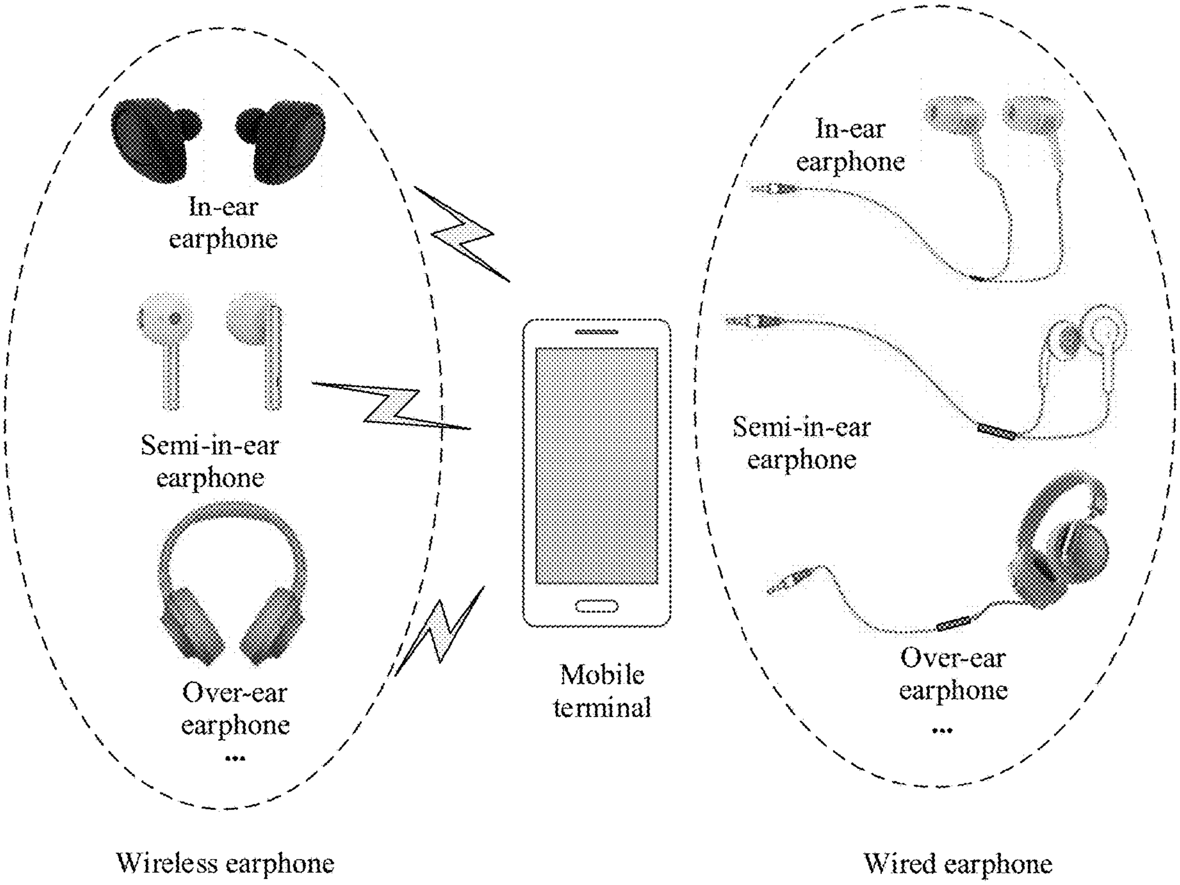
FIG. 1 is a schematic diagram of a system architecture according to an embodiment of this application.

The terms used in embodiments of this application are merely for the purpose of illustrating specific embodiments, and are not intended to limit this application. The terms "a", "said", and "the" of singular forms used in embodiments of this application and the appended claims are also intended to include plural forms, unless otherwise specified in the context clearly. It should also be understood that, the term "and/or" used herein indicates and includes any or all possible combinations of one or more associated listed items. The terms "include", "have", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, product, or device.

It should be understood that in this application, "at least one (item)" means one or more, and "plurality" means two or more. The term "and/or" is used to describe an association relationship between associated objects, and indicates that three relationships may exist. For example, "A and/or B" may indicate the following three cases: Only A exists, both A and B exist, and only B exists, where A and B may be singular or plural. The character "I" generally indicates an "or" relationship between the associated objects. At least one of the following items (pieces) or a similar expression thereof indicates any combination of these items, including a single item (piece) or any combination of a plurality of items (pieces). For example, at least one of a, b, or c may indicate a, b, c, a and b, a and c, b and c, or a, b, and c, where a, b, and c may be singular or plural.

This application provides a method for reducing an occlusion effect of an earphone. The method can be applied to an earphone having at least one microphone (microphone) and a speaker. The earphone herein may be an earphone, or may be a device that needs to be in an ear, such as a stethoscope device or a hearing aid. This specification mainly uses an earphone as an example to describe the technical solution. The microphone is an apparatus for capturing a sound signal, and the speaker is an apparatus for playing a sound signal. The microphone may also be referred to as a mic, a headset, a pickup, a receiver, a transducer, a sound sensor, an acoustic sensor, an audio capture apparatus, or another appropriate term. This specification mainly uses a microphone as an example to describe the technical solution. The "at least one microphone" in this application may include one or a combination of a main microphone (main mic), a reference microphone (reference mic), and an error microphone (error mic). The main microphone is sometimes referred to as a talking microphone. There may be one or more main microphones, one or more reference microphones, and one or more error microphones.

FIG. 1 is a schematic diagram of a system architecture according to an embodiment of this application. The system architecture includes a terminal (a smartphone is used as an example in the figure) and an earphone, and a communication connection may be established between the earphone and the terminal.

In terms of a communication mode between the earphone and the terminal, the earphone to which this application is applied may be a wireless earphone or a wired earphone. The wireless earphone is an earphone that may be connected to the terminal in a wireless manner. Wireless earphones may be further classified into the following types based on electromagnetic wave frequencies used by the wireless earphones: an infrared wireless earphone, a meter wave wireless earphone (for example, an FM frequency modulation earphone), a decimeter wave wireless earphone (for example, a Bluetooth (Bluetooth) earphone), and the like. The wired earphone is an earphone that may be connected to the terminal by using a wire (for example, a cable). Wired earphones may be further classified into a cylindrical cable earphone, a noodle cable earphone, and the like based on cable shapes.

In terms of a manner of wearing the earphone, the earphone to which this application is applied may be an in-ear earphone, a semi-in-ear earphone, an over-ear earphone (which may also be referred to as an ear-muff earphone), an ear-mounted earphone, a neck-mounted earphone, and the like.

In terms of a structure and function of the earphone, the earphone to which this application is applied may be a closed earphone, an open earphone, a semi-open earphone, a semi-in-ear earphone, or the like.

In terms of a noise reduction mode of the earphone, the earphone to which this application is applied may be an earphone with an active noise cancellation (ANC) function, an earphone with a passive noise cancellation function, or an earphone without a noise reduction function.

The active noise cancellation (ANC) means that ambient noise is captured by using an independent pickup microphone on the earphone, and then a built-in chip performs real-time operations to generate anti sound waves to cancel the noise, thereby achieving an effect of sensory noise reduction. The active noise cancellation may be classified into feedforward (FF) active noise cancellation and feedback (FB) active noise cancellation based on different locations of the pickup microphone.

The terminal may also be referred to as user equipment (UE), a wearable device, a mobile unit, a subscriber unit, a radio unit, a remote unit, a mobile device, a wireless device, a wireless communication device, a remote device, a mobile subscriber station, a terminal device, an access terminal, a mobile terminal, a wireless terminal, an intelligent terminal, a remote terminal, a handset, a user agent, a mobile client, a client, or another appropriate term. For example, the terminal may be a mobile terminal such as a smartphone, a tablet computer, or a notebook computer, or may be a smart home device such as a loudspeaker device, a smart television, a smart air conditioner, or a smart refrigerator, or may be a vehicle-mounted device such as an electric bicycle device or an automobile device.

The earphone may also be referred to as an earbud, a headset, a walkman, an audio player, a media player, an earpiece device, or another appropriate term.

Figure 2:
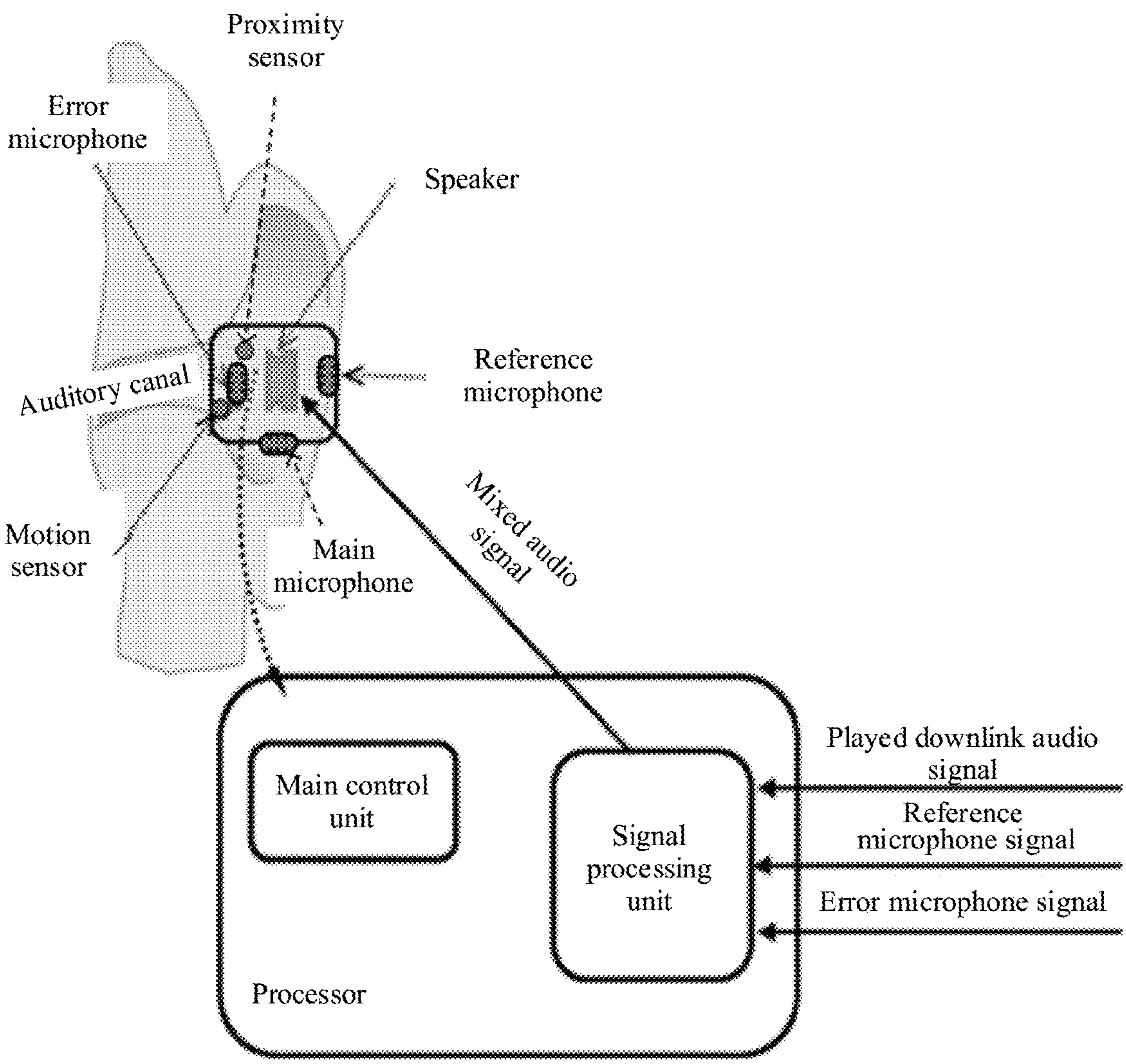
FIG. 2 is a schematic diagram of a scenario in which a user wears an earphone according to an embodiment of this application.

FIG. 2 is a schematic diagram of an example scenario in which a user wears an earphone provided in an embodiment of this application. The earphone has an occlusion effect reduction (OR) function, and optionally has an active noise cancellation function.

As shown in FIG. 2, the earphone includes, for example, at least one of a reference microphone, an error microphone, and a main microphone, a speaker, a main control unit (MCU), and a signal processing unit. Optionally, the earphone may further include at least one of a proximity sensor and a motion sensor.

The main control unit and the signal processing unit may be integrated on one processor, or may be on two processors that are independent of each other. The processor is a control center of the earphone and may also be referred to as a controller, a control unit, a microcontroller, or another appropriate term. The processor is connected to each component of the earphone by using various interfaces and lines. In a possible embodiment, the processor may further include one or more processing cores.

In this embodiment of this application, the main control unit may be, for example, configured to control a working time sequence of each component of the earphone, configure a working parameter of each component of the earphone, and analyze, by using an algorithm, data captured by at least one microphone or sensor, to use a corresponding working policy.

The signal processing unit may be configured to process a sound signal captured by the at least one microphone, for example, perform filtering processing, level/volume adjustment, and mixing processing. A mixed audio signal obtained by the signal processing unit may be further transmitted to the speaker for playing.

In this embodiment of this application, the speaker is further configured to play a downlink audio signal or comfort noise, so that the audio signal or comfort noise enters a user's auditory canal. For example, the downlink audio signal may be a music signal or a voice signal. The comfort noise is a special type of background noise, and refers to specific sound for relaxing the user, to prevent the user's auditory canal from being excessively quiet. For example, the comfort noise may also be used as background noise when a brief silence occurs during a call.

In a state in which the user normally wears the earphone, the reference microphone is usually disposed on one side of the earphone away from the auditory canal (that is, an outer side of the earphone), and is configured to capture a sound signal or noise in an external environment. In this embodiment of this application, for example, the reference microphone may capture a sound signal propagated in the air when the user speaks.

The error microphone is usually disposed on one side of the earphone in the auditory canal (that is, an inner side of the earphone), and is relatively close to the speaker, and is configured to capture a sound signal in the user's auditory canal. In this embodiment of this application, the error microphone may capture, for example, a sound signal propagated by bone conduction when the user speaks, or may capture noise in the auditory canal, where the noise is caused by vibration of the earphone, shaking of an earphone wire, head turning, or vibration of the earphone generated by external collision or friction when the user wearing the earphone moves.

The main microphone is usually disposed on a lower side of the earphone, and is configured to capture a voice of the user, for example, a voice in a call scenario.

Generally, the earphone does not fit in completely with the auditory canal. Therefore, a gap inevitably exists between the earphone and the auditory canal, and an external sound signal or ambient noise enters the auditory canal through the gap. In addition, because sizes and shapes of auditory canals of different users are different, degrees of matching between earphones of a same model and different human ears are different, and there are also noise differences in noise leakage into auditory canals of different users wearing the earphones of the same model. When the user wears the earphone, a degree of leakage of ambient noise into the user's auditory canal may be referred to as a leakage degree. It should be understood that a degree of matching between the earphone and the user's auditory canal may be reflected by a leakage degree. In this embodiment of this application, different leakage degrees may be caused by different degrees of matching between the earphone and the auditory canal.

In some possible embodiments, the earphone may be further equipped with an eartip, so that the earphone fully fits in with the user's auditory canal and that the user obtains a better passive noise cancellation effect.

In some possible embodiments, when at least one of the reference microphone and the error microphone exists in the earphone, the active noise cancellation function may be further implemented by using at least one of the reference microphone and the error microphone. An active noise cancellation earphone emits, by using a speaker, noise comparable in amplitude and opposite in phase to external ambient noise, so that noise heard by a user wearing the earphone is reduced. An objective of an active noise cancellation technology is to phase-invert unwanted noise by using an adaptive filter, thereby constraining noise to a fixed range.

Generally, a user hears the user's own speech from two paths: an internal path of propagation by bone conduction and an external path of propagation through the air. In the conventional technology, when a user wears an earphone with a relatively good closing effect, if the user speaks, gains of sound signals of the user speaking on the two paths are changed, that is, sound signals propagated by bone conduction are enhanced, and sound signals propagated through the air propagation path are weakened. Consequently, the user wearing the earphone feels that the speech of the user is distorted and unnatural, that is, an occlusion effect is generated. In addition, when the earphone is in a state of being worn by the user, the earphone vibrates, an earphone wire shakes, the user's head turns, or the earphone vibrates due to external collision or friction when the user wearing the earphone moves. The vibration is further transferred to an auditory canal, resulting in an occlusion effect that makes the user uncomfortable to hear.

In this embodiment of this application, based on a method provided in this embodiment of this application, occlusion effect reduction or elimination (OR) can be adaptively initiated in an occlusion effect generation scenario on a basis of an existing hardware component of the earphone.

Figure 3:
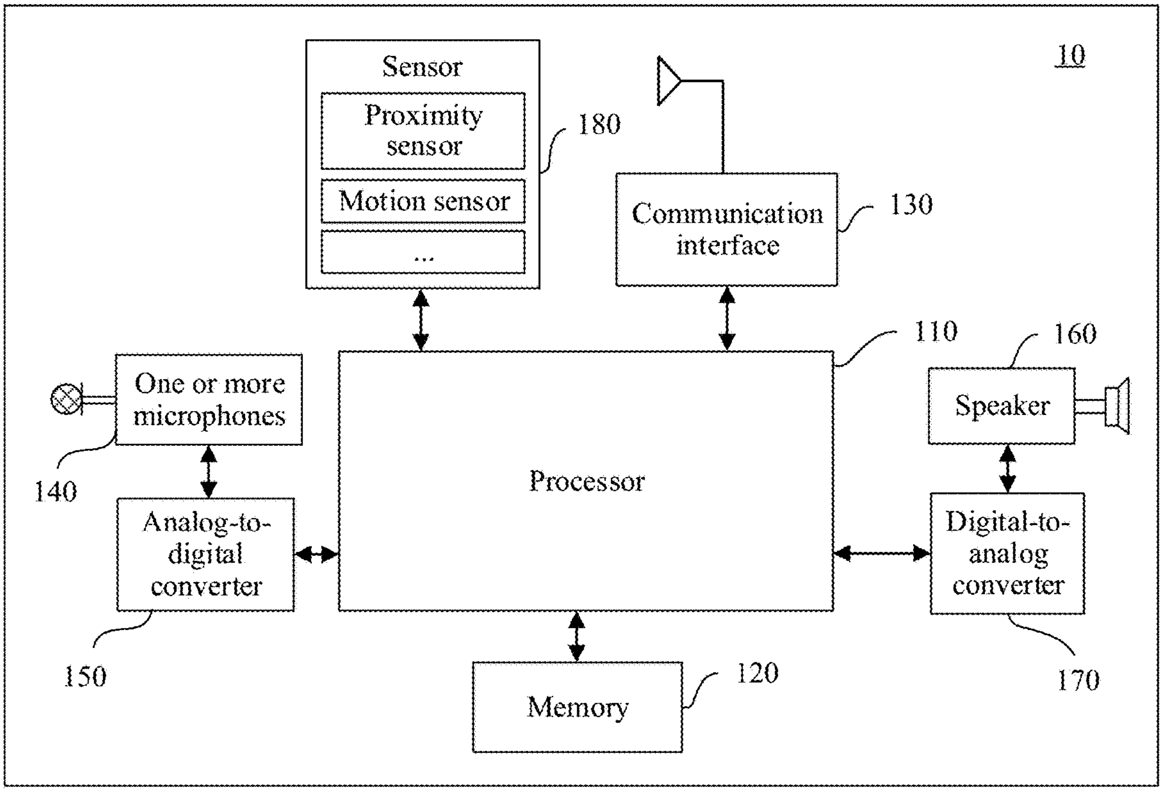
FIG. 3 is a schematic diagram of a structure of an earphone according to an embodiment of this application.

Further, FIG. 3 is a schematic diagram of a structure of an earphone 10 according to an embodiment of this application. The earphone 10 includes one or more processors 110, one or more memories 120, a communication interface 130, an audio capture circuit, and an audio playing circuit. The audio capture circuit may further include one or more microphones 140 and an analog-to-digital converter (ADC) 150. The audio playing circuit may further include a speaker 160 and a digital-to-analog converter (DAC). Optionally, the earphone 10 may further include one or more sensors 180, for example, a proximity sensor, a motion sensor, or an inertial sensor. These hardware components may communicate with each other over one or more communication buses. The following describes the components separately.

The processor 110 is a control center of the earphone 10 and may also be referred to as a control unit, a controller, a microcontroller, or another appropriate term. The processor 110 is connected to each component of the earphone 10 by using various interfaces and lines. In a possible embodiment, the processor 110 may further include one or more processing cores. In a possible embodiment, a main control unit (not shown in the figure) and a signal processing unit (not shown in the figure) may be integrated with the processor 110. The main control unit (MCU) is configured to receive data captured by the sensor 180, a monitoring signal from the signal processing unit, or a control signal from a terminal (for example, a mobile phone APP), and finally control the earphone 10 through comprehensive determining and decision. The signal processing unit may be configured to process a sound signal captured by the one or more microphones 140, and perform mixing processing with a downlink audio signal or comfort noise. The signal processing unit drives the speaker 160 to play a mixed signal to mask an occlusion effect, thereby implementing occlusion effect reduction or elimination (OR).

The memory 120 may be coupled to the processor 110, or connected to the processor 110 by using a bus, and is configured to store various software programs and/or a plurality of groups of instructions and data. In a specific implementation, the memory 120 may include a high-speed random access memory, and may also include a non-volatile memory, such as one or more disk storage devices, an embedded multimedia card (EMMC), a universal flash storage (UFS), a read-only memory (ROM), or a flash memory (flash), or another type of static memory that can store static information and instructions. The memory 120 may further store one or more computer programs, and the one or more computer programs include program instructions of the method described in this application. The memory 120 may further store a communication program, and the communication program may be used to communicate with the terminal. In an example, the memory 120 may further store data or program instructions, and the processor 110 may be configured to invoke and execute the data or program instructions in the memory 120.

Optionally, the memory 120 may be a memory outside the MCU, or may be a storage unit built in the MCU.

The communication interface 130 is configured to communicate with the terminal, and the communication mode may be wired, or may be wireless. When the communication mode is wired communication, the communication interface 130 may be connected to the terminal by using a cable. When the communication mode is wireless communication, the communication interface 130 is configured to receive and send radio frequency signals, and the wireless communication mode supported by the communication interface 130 may be, for example, at least one of Bluetooth communication, wireless-fidelity (Wi-Fi) communication, infrared communication, or cellular 2G/3G/4G/5G communication. In a specific implementation, the communication interface 130 may include but is not limited to an antenna system, an RF transceiver, one or more amplifiers, a tuner, one or more oscillators, a digital signal processor, a CODEC chip, a SIM card, a storage medium, and the like. In some embodiments, the communication interface 130 may be implemented on a separate chip.

In a specific embodiment of this application, the communication interface 130 may be configured to receive a level index used to indicate a degree of occlusion effect reduction. For example, the level index is set by a user in an application (APP) of the terminal and transmitted to the communication interface 130 by using a wireless link. For example, the wireless link may be a Bluetooth link. The level index is used by the main control unit to determine a filter parameter corresponding to a filter, and/or playing volume of a downlink audio signal, and/or a level of comfort noise. The level index may be related to a degree of matching between the user's auditory canal and the earphone, or in other words, an optimal OR effect can be obtained by performing OR based on the level index. It may be understood that the most appropriate level indexes corresponding to different users may be different.

The memory 120 is further configured to store a filter parameter library, comfort noise, and the like. The main control unit may be configured to select, from the filter parameter library based on the level index received by the communication interface 130, a filter coefficient corresponding to the level index. Optionally, the main control unit is further configured to write the filter coefficient to a location of the filter coefficient corresponding to the filter in the signal processing unit, thereby configuring the filter. In addition, the main control unit may be further configured to determine the volume of the downlink audio signal or the level of the comfort noise based on the level index.

The one or more microphones 140 may include at least one of a reference microphone, an error microphone, and a main microphone. The microphone 140 may be configured to capture a sound signal (or referred to as an audio signal, where the audio signal is an analog signal). The analog-to-digital converter 150 is configured to convert the analog signal captured by the microphone 140 into a digital signal, and send the digital signal to the processor 110 for processing. In a specific embodiment, the digital signal may be sent to the signal processing unit for processing. The signal processing unit may transmit a processed signal (for example, a mixed audio signal) to the digital-to-analog converter 170. The digital-to-analog converter 170 may convert the received signal into an analog signal and further transmit the analog signal to the speaker 160. The speaker is configured to play the analog signal, so that the user can hear the sound.

A person skilled in the art may understand that the earphone 10 is merely an example provided in this embodiment of this application. In a specific implementation of this application, the earphone 10 may have more or fewer components than those shown, may combine two or more components, or may have different configurations of components. It should be noted that, in an optional case, the foregoing components of the earphone 10 may alternatively be coupled together.

It should be understood that, in each embodiment of this application, the term "coupling" refers to interconnecting in a specific manner, and includes a direct connection or an indirect connection through another device, for example, connections through various interfaces, transmission lines, or buses. These interfaces are generally electrical communication interfaces. However, possible mechanical interfaces or interfaces in other forms are not precluded. This is not limited in this embodiment of this application.

Figure 4:
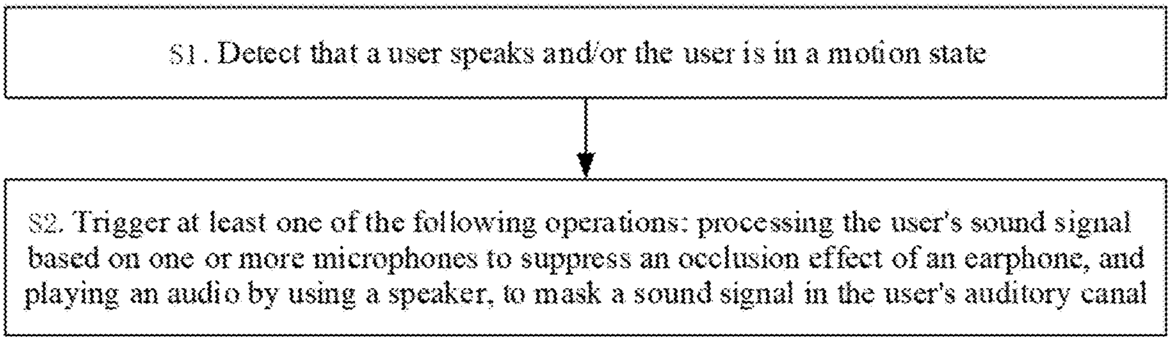
FIG. 4 is a schematic flowchart of a method for reducing or eliminating an occlusion effect of an earphone according to an embodiment of this application.

Based on the earphone structure described in FIG. 3, the following describes an OR implementation method provided in an embodiment of this application. FIG. 4 is a schematic flowchart of a method for reducing or eliminating an occlusion effect of an earphone according to an embodiment of this application. The method may be applied to an earphone having at least one microphone and a speaker. The method includes but is not limited to the following steps.

S1. Detect occurrence of at least one of the following events: a user speaks and the user is in a motion state.

S2. Trigger at least one of the following operations in response to the at least one event: processing the user's sound signal based on one or more microphones to suppress an occlusion effect of the earphone, and playing an audio by using the speaker, to mask a sound signal in the user's auditory canal.

Figure 5:
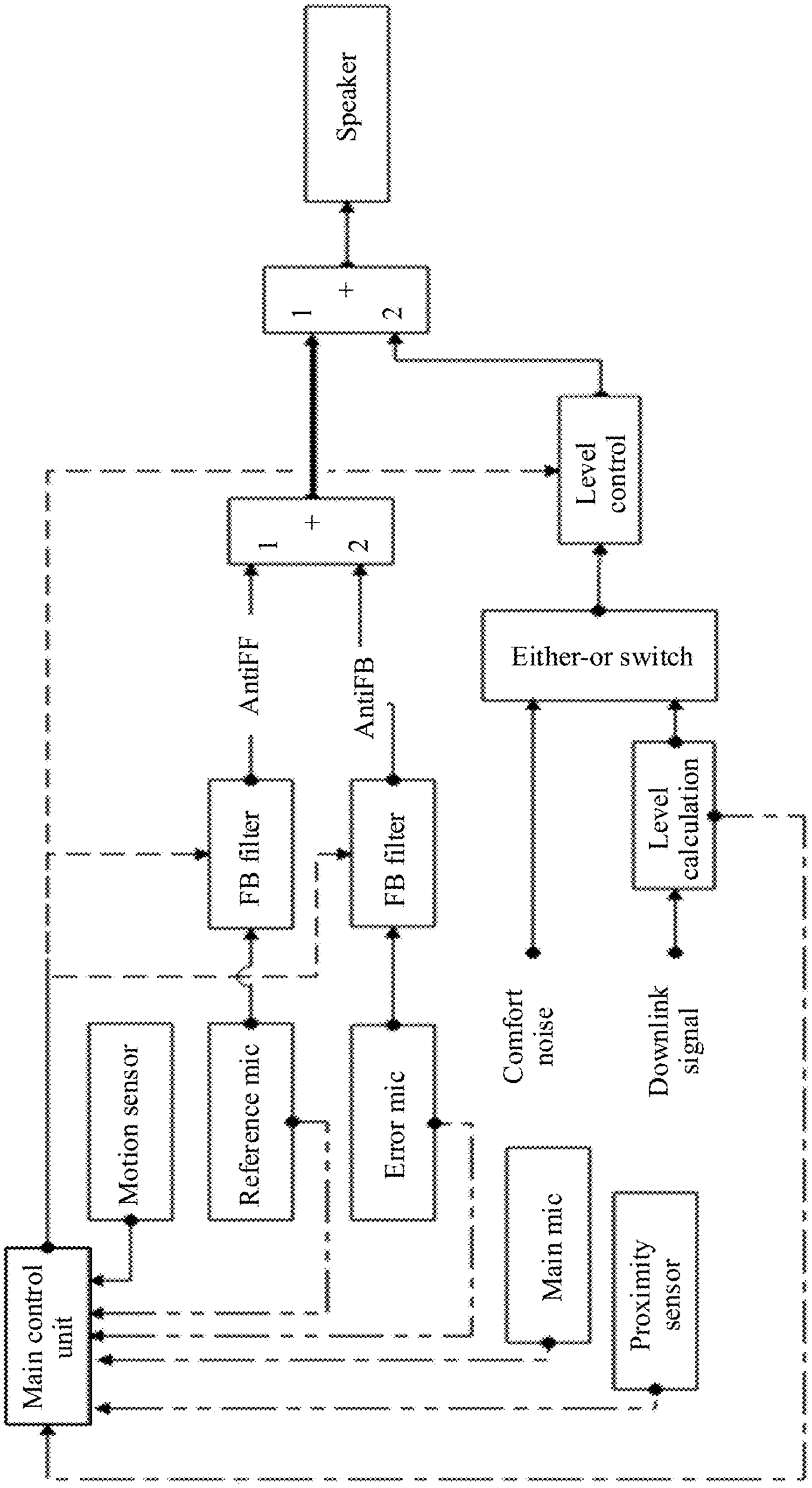
FIG. 5 is a schematic diagram of a scenario in which components in an earphone cooperate with each other to eliminate an occlusion effect according to an embodiment of this application.

For better understanding the solution of this application, FIG. 5 is a schematic diagram of an example scenario in which components in the earphone cooperate with each other to eliminate an occlusion effect according to this application. In the embodiment shown in FIG. 5, the microphone of the earphone includes at least one of a reference microphone, an error microphone, and a main microphone, and sensors of the earphone include a motion sensor and a proximity sensor.

It may be understood that, when the user wears the earphone, the occlusion effect usually occurs in a scenario in which the user speaks or a scenario in which the earphone vibrates due to motion of the user. In an embodiment of S1, to eliminate the occlusion effect in a scenario in which the user moves, based on control of a main control unit, the motion sensor and the proximity sensor may be used to detect whether the user is in the motion state; and when it is detected that the user is in the motion state, a corresponding OR operation is initiated. Specifically, it may be first determined, based on data captured by the proximity sensor, that the earphone is in a state of being worn by the user, and then it is further determined, based on data captured by the motion sensor, whether the user is in the motion state.

In an embodiment of S1, to eliminate the occlusion effect in a scenario in which the user speaks, whether the user speaks may be detected by using a microphone of the earphone. When it is detected that the user speaks, the corresponding OR operation is initiated. For example, when the one or more microphones include at least one of a reference microphone, a main microphone, or an error microphone, a voice activity detection (VAD) algorithm may be used to analyze or recognize a sound signal captured by at least one of the reference microphone, the main microphone, or the error microphone. Voice activity detection (VAD) is also referred to as voice endpoint detection or voice boundary detection. The VAD can recognize a silence period in the user's speech from a voice signal stream, and generate and transmit the user's sound signal only when a sudden active voice is detected. Therefore, whether the event that the user speaks occurs can be determined based on a result of recognition by the VAD.

It may be understood that, based on the foregoing technical solutions of this application, when a scenario in which the user both moves and speaks occurs, a subsequent corresponding OR operation may be initiated based on any one or two of the foregoing detection solutions.

In S2, the operation triggered in response to the at least one event is an OR operation. In an embodiment, the OR operation is to process the user's sound signal based on the one or more microphones to suppress the occlusion effect of the earphone.

For example, the user's sound signal propagated in the air may be captured by using the reference microphone; the sound signal captured by the reference microphone is processed by using a feedforward filter (FF filter), to obtain a to-be-compensated sound signal, and the to-be-compensated sound signal is played by using the speaker; and the to-be-compensated sound signal is combined with sound leaked into the auditory canal through a gap between the earphone and an ear. Therefore, the user's voice can be reproduced, that is, the user's sound signal can be transparently transmitted to the user's auditory canal. In this way, the sound signal in the air propagation path is enhanced, and the occlusion effect of the earphone is reduced or even eliminated.

For another example, the sound signal propagated in the user's auditory canal may be captured by using the error microphone. In a scenario in which the user speaks, the sound signal propagated in the user's auditory canal may be caused by the user's sound signal propagated by bone conduction. In a scenario in which the user moves, the sound signal propagated in the user's auditory canal may be caused by friction of the earphone or vibration of an earphone wire due to motion of the user. Then the sound signal captured by the error microphone may be processed by using a feedback filter (FB filter), to obtain anti-noise signal, where the anti-noise signal is comparable in amplitude and opposite in phase to the sound signal in the user's auditory canal. Therefore, when the anti-noise signal is played by using the speaker, the anti-noise signal can weaken or cancel the sound signal in the user's auditory canal, the sound signal propagated by bone conduction or the sound signal caused by vibration of the earphone is weakened, and the occlusion effect of the earphone is reduced or even eliminated.

For another example, OR operations of the reference microphone and the error microphone may also be combined to enhance the sound signal in the air propagation path and weaken the sound signal propagated by bone conduction or the sound signal caused by vibration of the earphone, to ensure that the occlusion effect of the earphone can be eliminated and that a better OR effect can be obtained.

In another embodiment, a masking effect may be further generated based on the speaker to suppress the occlusion effect of the earphone. In this specification, generating the masking effect based on the speaker to suppress the occlusion effect of the earphone is specifically playing, according to a masking effect principle, the audio by using the speaker to suppress and mask the sound signal in the user's auditory canal, thereby reducing or even eliminating the occlusion effect of the earphone. The sound signal propagated in the user's auditory canal may be, for example, a sound signal propagated to the user's auditory canal by bone conduction when the user speaks, or may be, for example, noise caused by friction of the earphone or vibration of the earphone wire due to motion of the user. In this embodiment of this application, the masking effect is to mask the sound signal in the user's auditory canal by stimulating an auditory sensation of the user by using a new audio signal, to weaken or even eliminate the user's perception of the sound signal.

For example, preset-level comfort noise may be played by using the speaker, where the comfort noise may be used to mask the sound signal propagated in the user's auditory canal.

For another example, volume of a played downlink audio signal may be adjusted and played by using the speaker, where the played downlink audio signal may be used to mask the sound signal propagated in the user's auditory canal. The played downlink audio signal may be, for example, a music signal or a voice call signal.

For another example, when both a solution to playing comfort noise and a solution to playing a downlink audio signal are configured for the earphone, an either-or switch may be configured to implement a solution selection. In other possible implementations, the solution to playing the comfort noise and the solution to playing the downlink audio signal may be further performed simultaneously.

It can be learned that, in this embodiment of this application, when the earphone detects, by using a sensor, that the user is in the motion state, or detects, by using the at least one microphone, that the user speaks, an OR procedure may be initiated. Hardware in the earphone is fully used to process the user's sound signal based on one or more microphones to suppress the occlusion effect of the earphone, and/or the audio is played by using the speaker, to mask the sound signal in the user's auditory canal. This can greatly reduce or even eliminate the occlusion effect generated when the user speaks or the user moves. In this way, the user can hear the user's own sound more realistically and naturally without distortion, discomfort caused by friction of the earphone or vibration of the earphone wire due to motion of the user is eliminated, and user experience is improved.

In a possible embodiment of this application, the user may control, by using an application (APP) on an intelligent mobile terminal (for example, a mobile phone or a tablet computer), enabling or disabling of an OR function, and set, by using the APP, a level index used to indicate a degree of occlusion effect reduction. For example, the user may select, by using a related control for adjusting the level index on the APP, a level index suitable for the user's auditory canal, and transmit the level index to a communication interface on an earphone side by using a Bluetooth link, so that the earphone obtains an optimal OR effect. A value of the level index that matches the user's auditory canal is related to a leakage degree of the user's auditory canal.

Figure 6:
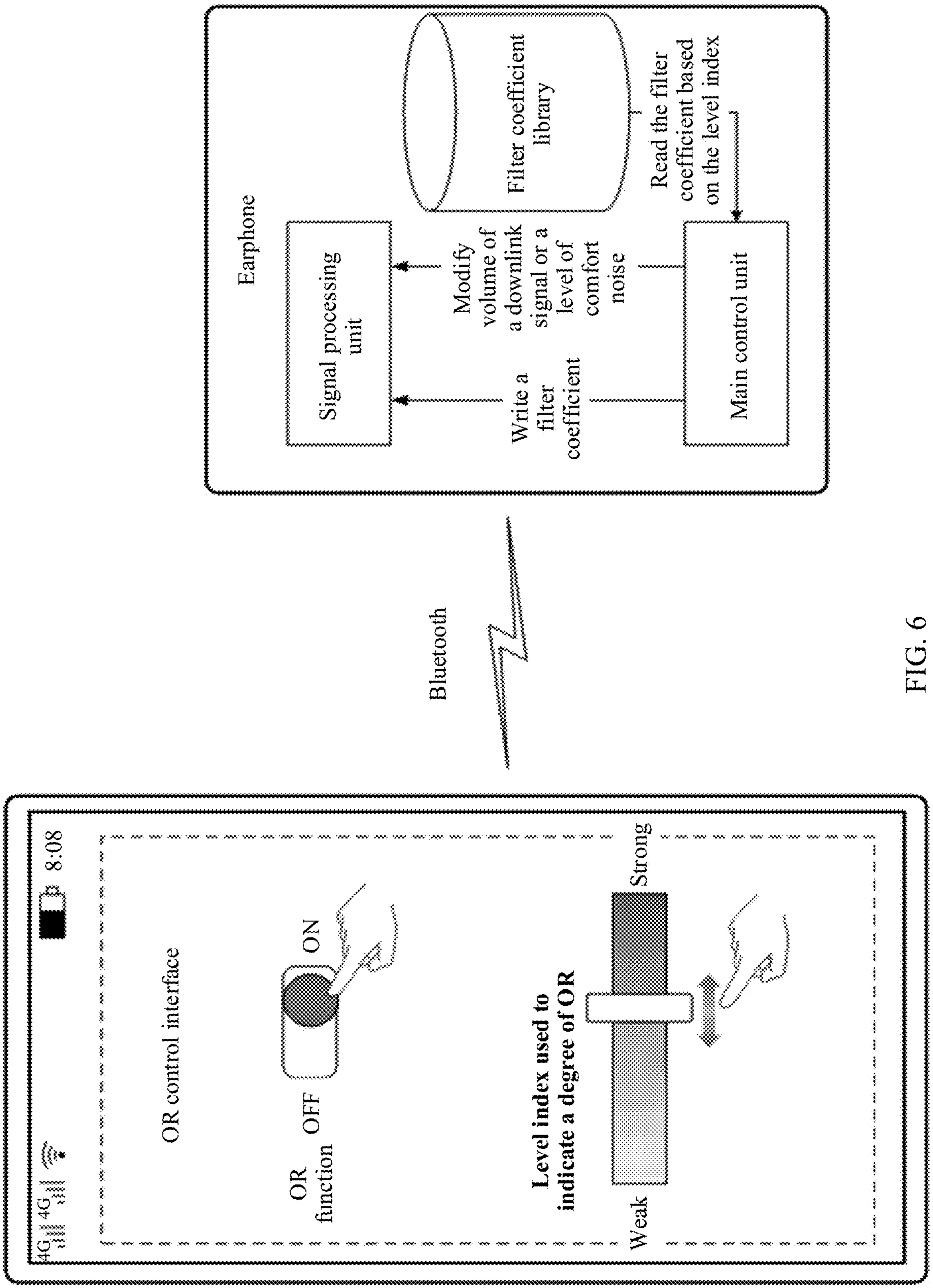
FIG. 6 is a schematic diagram of a control interface of an example application according to an embodiment of this application.

FIG. 6 is a control interface of an example application (APP) according to an embodiment of this application. In an optional case, the control interface may be considered as a user-oriented input interface or a user-oriented input module. Controls or functional modules with a plurality of functions are provided on the input interface, so that the user controls the earphone by controlling related controls or functional modules. In the example in FIG. 6, the control interface may include a switch control module and a level index adjustment control, and the switch control module includes two positions: "OFF" and "ON". Optionally, identifiers of the positions may alternatively be in Chinese. For example, the two positions "OFF" and "ON" are included. When the switch control module is set to "OFF" or "OFF", the OR function of the earphone is disabled. When the switch control module is set to "ON" or "ON", the OR function of the earphone is enabled. An indication of the level index adjustment control is a symbol or a graph displayed on the control interface. For example, the level index adjustment control may include an adjustment bar for touch control by the user, and the adjustment bar may move within a level index range based on the touch control by the user. The level index range may further include, for example, text symbols "strong" and "weak", or an Arabic digit symbol used to indicate a value of a corresponding level index. The user may set the level index of OR by dragging a location of the adjustment bar within the level index range. When the user stops dragging, the APP records the location of the indication adjustment bar, obtains a level index value corresponding to the location, and transmits the level index to the earphone by using Bluetooth or another wireless link. Optionally, the control interface may further include a text prompt (not shown in the figure) for prompting the user that an optimal location point for an OR effect varies from person to person.

Figure 7:
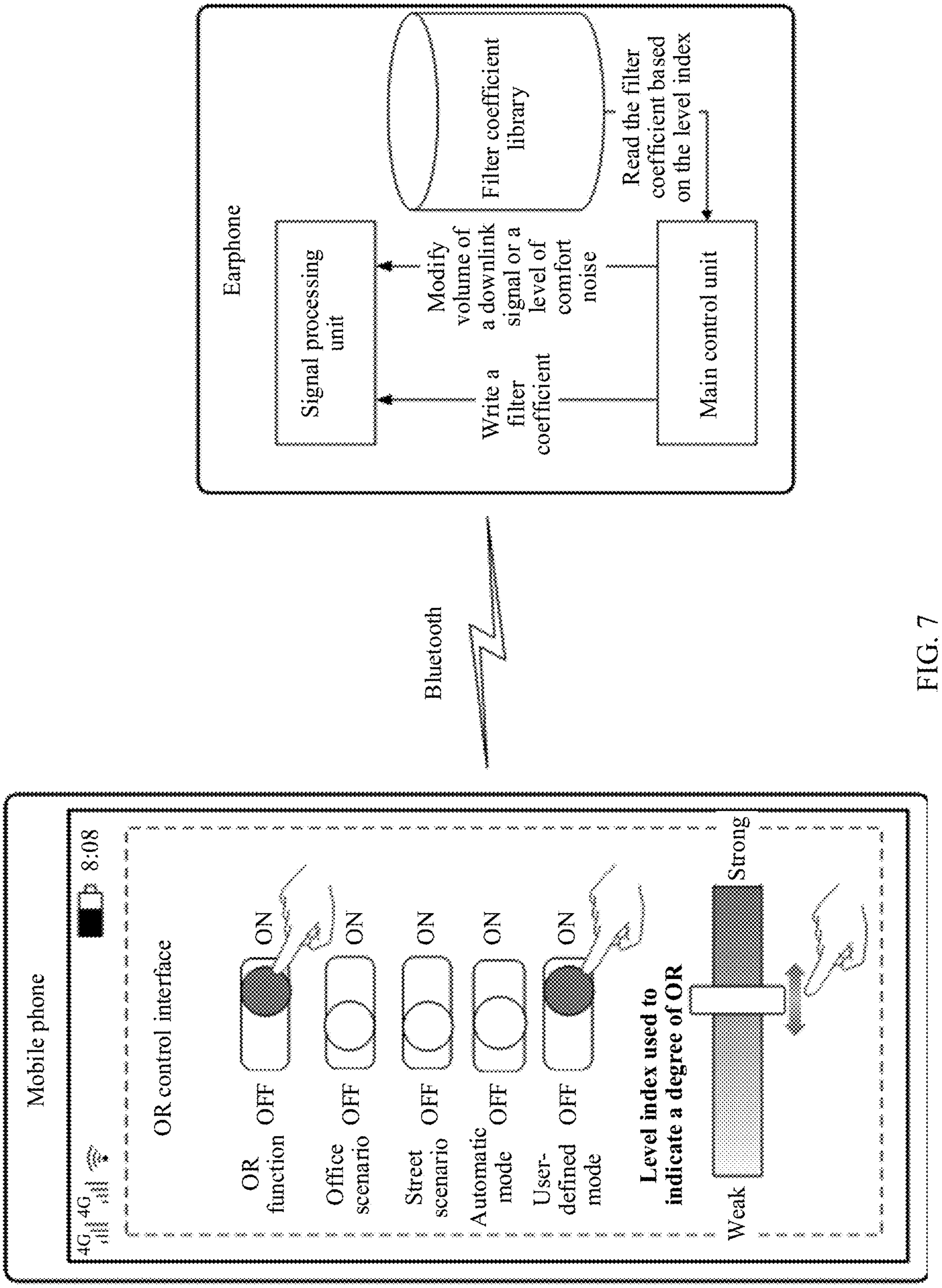
FIG. 7 is a schematic diagram of a control interface of another example application according to an embodiment of this application.

FIG. 7 is a control interface of another example application (APP) according to an embodiment of this application. In the example in FIG. 7, the control interface may include more functions. For example, the control interface includes a switch control module and a plurality of level index controls, and the level index controls are classified into a scenario mode, an automatic mode, and a custom mode, so that the user selects a corresponding level index control based on a preference of the user or a requirement of the scenario. Each level index control may include two positions: “OFF” and “ON”. Optionally, identifiers of the positions may alternatively be in Chinese. For example, the two positions “OFF” and “ON” are included. When the custom mode is set to “ON” or “ON”, the level index adjustment control may be further activated, and ON an indication of the level index adjustment control is a symbol or a graph displayed on the control interface. For example, the level index adjustment control may include an adjustment bar for touch control by the user, and the adjustment bar may move within a level index range based on the touch control by the user. The level index range may further include, for example, text symbols “strong” and “weak”, or an Arabic digit symbol used by the user to indicate a custom value of a corresponding level index. The user may set the level index of OR by dragging a location of the adjustment bar within the level index range. This helps the user autonomously adjust the level index to a value most suitable for the user’s auditory canal. When the user stops dragging, the APP records the location of the indication adjustment bar, obtains a level index value corresponding to the location, and transmits the level index to the earphone by using Bluetooth or another wireless link.

In addition, the scenario mode may include, for example, an office scenario mode and a street scenario mode. Each scenario mode corresponds to a preset level index. In other words, a level index corresponding to the office scenario mode can enable the user to obtain a better OR effect in an office scenario, and a level index corresponding to the street scenario mode can enable the user to obtain a better OR effect in a street scenario, thereby meeting OR requirements of the user in different scenarios, reducing user operations, and improving user experience. Specifically, when the user sets the custom mode to “OFF” or “OFF”, and the office scenario mode or the street scenario mode to “ON” or “ON”, the APP automatically obtains a level index value corresponding to the office scenario mode or the street scenario mode, and transmits the level index to the earphone by using Bluetooth or another wireless link.

In addition, in the automatic mode, the APP can actively detect an external environment, automatically determine a scenario in which the user is currently (for example, a noisy scenario, a quiet scenario, a street scenario, an office scenario, a motion scenario, a still scenario, a speaking scenario, or a non-speaking scenario), and automatically select a corresponding level index based on the current scenario. This further meets OR requirements of the user in different scenarios, avoids operations of the user in different scenarios, and improves user experience. Specifically, when the scenario mode and the custom mode are set to “OFF” or “OFF”, and the automatic mode is set to “ON” or “ON”, the APP automatically detects an environment in which the user is currently located, determines a level index value corresponding to the scenario, and transmits the level index to the earphone by using Bluetooth or another wireless link.

It should be noted that the embodiment in FIG. 6 or FIG. 7 is merely used to describe the solution of this application but is not intended to limit the solution. In an actual application, the control interface on the APP may further include more or fewer controls/elements/symbols/functions/texts/patterns/colors, or variations of controls/elements/symbols/functions/texts/patterns/colors in other forms may be displayed on the control interface. For example, the level index adjustment control may alternatively be designed in a form of an adjustment disc. This is not limited in this embodiment of this application.

After obtaining the level index, the main control unit (MCU) in the earphone may start OR in one or more of the following manners:

(1) The main control unit selects an appropriate FF filter coefficient and/or FB filter coefficient from a filter coefficient library in a memory based on the level index, and writes the filter coefficient to the FF filter and/or FB filter in a signal processing unit, so that the solution to processing the user’s sound signal based on the microphone to suppress the occlusion effect of the earphone is subsequently performed to obtain the OR effect in the level index. A binding relationship exists between the level index and the FF filter coefficient and/or the FB filter coefficient.

(2) The main control unit adjusts the volume of the downlink audio signal and/or adjusts the level of the comfort noise based on the level index, so that the solution to suppressing the occlusion effect of the earphone based on the masking effect generated by the speaker is subsequently performed to obtain the OR effect in the level index. A binding relationship exists between the level index and the volume of the downlink audio signal and/or the level of the comfort noise.

In a possible implementation, the foregoing manner may be selected based on a hardware configuration of the earphone. For example, when the hardware configuration of the earphone includes the error microphone and/or the reference microphone, the manner (1) may be selected; otherwise, the manner (2) may be selected.

In another possible implementation, the foregoing manner may be selected based on an occlusion effect generation scenario. For example, when the occlusion effect is caused by the speaking of the user, the manner (1) may be selected. When the occlusion effect is caused by friction of the earphone or vibration of the earphone wire due to motion of the user, the manner (1) or the manner (2) may be selected.

Figure 8:
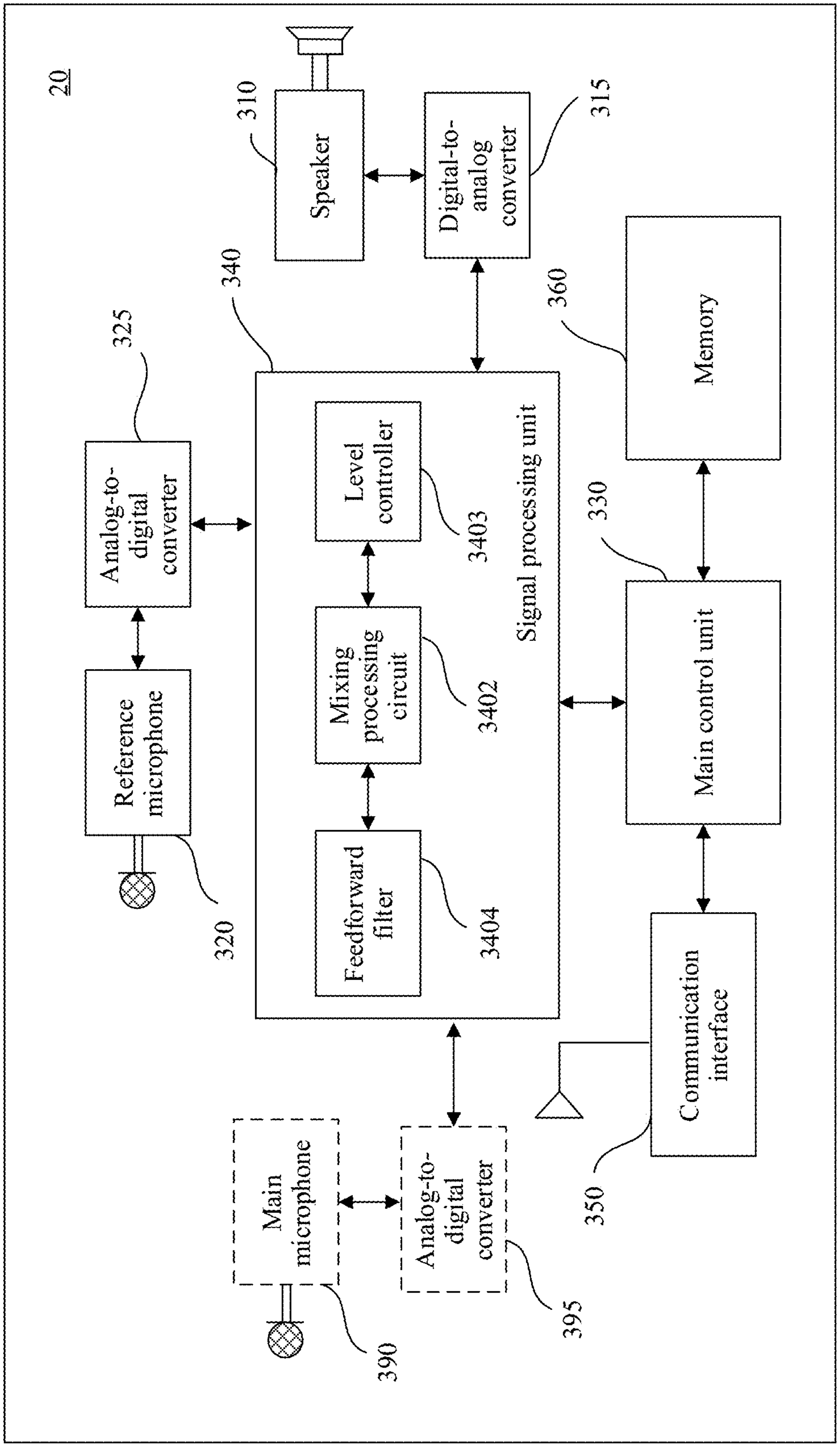
FIG. 8 is a schematic diagram of a structure of another earphone according to an embodiment of this application.

Further, FIG. 8 is a schematic diagram of a structure of another earphone 20 according to an embodiment of this application. A main difference between the earphone 20 and the earphone 10 in the embodiment in FIG. 3 lies in that a microphone in the earphone includes a reference microphone but does not include an error microphone. As shown in FIG. 8, the earphone 20 includes a reference microphone 320, an analog-to-digital converter (ADC) 325 connected to the reference microphone 320, a speaker 310, a digital-to-analog converter (DAC) 315 connected to the speaker 310, a main control unit 330, a signal processing unit 340, a memory 360, and a communication interface 350. Optionally, the earphone 20 further includes a main microphone 390 and an analog-to-digital converter 395 connected to the main microphone 390. These hardware components may communicate with each other over one or more communication buses. The main control unit and the signal processing unit may be integrated on one processor chip, or may be on two processor chips that are independent of each other. The signal processing unit 340 may further include a feedforward filter 3404. Optionally, the signal processing unit 340 further includes a mixing processing circuit 3402 and a level controller 3403.

In this embodiment of this application, the main control unit 330 may be, for example, configured to control a working time sequence of each component of the earphone, configure a working parameter of each component of the earphone, and analyze, by using an algorithm, data captured by the reference microphone 320 or the main microphone 390, to use a corresponding working policy. The memory 360 is further configured to store a filter parameter library, comfort noise, and the like. The main control unit may be configured to select, from the filter parameter library based on a level index received by the communication interface 350, a filter coefficient corresponding to the level index. Optionally, the main control unit is further configured to write the filter coefficient to a location of the filter coefficient corresponding to the feedforward filter 3404 in the signal processing unit, thereby configuring the filter. In addition, the main control unit may be further configured to determine volume of a downlink audio signal or a level of comfort noise based on the level index, thereby instructing the level controller 3403 to adjust the volume of the downlink audio signal or the level of the comfort noise. The mixing processing circuit 3402 may be configured to perform mixing processing on a signal processed by the feedforward filter 3404, the signal processed by the level controller 3403, and the like, to obtain a mixed audio signal. Further, the mixed audio signal is processed by the digital-to-analog converter 315 and transmitted to the speaker 310 for playing.

A person skilled in the art may understand that the earphone 20 is merely an example provided in this embodiment of this application. In a specific implementation of this application, the earphone 20 may have more or fewer components than those shown, may combine two or more components, or may have different configurations of components. It should be noted that, in an optional case, the foregoing components of the earphone 20 may alternatively be coupled together.

Figure 9:
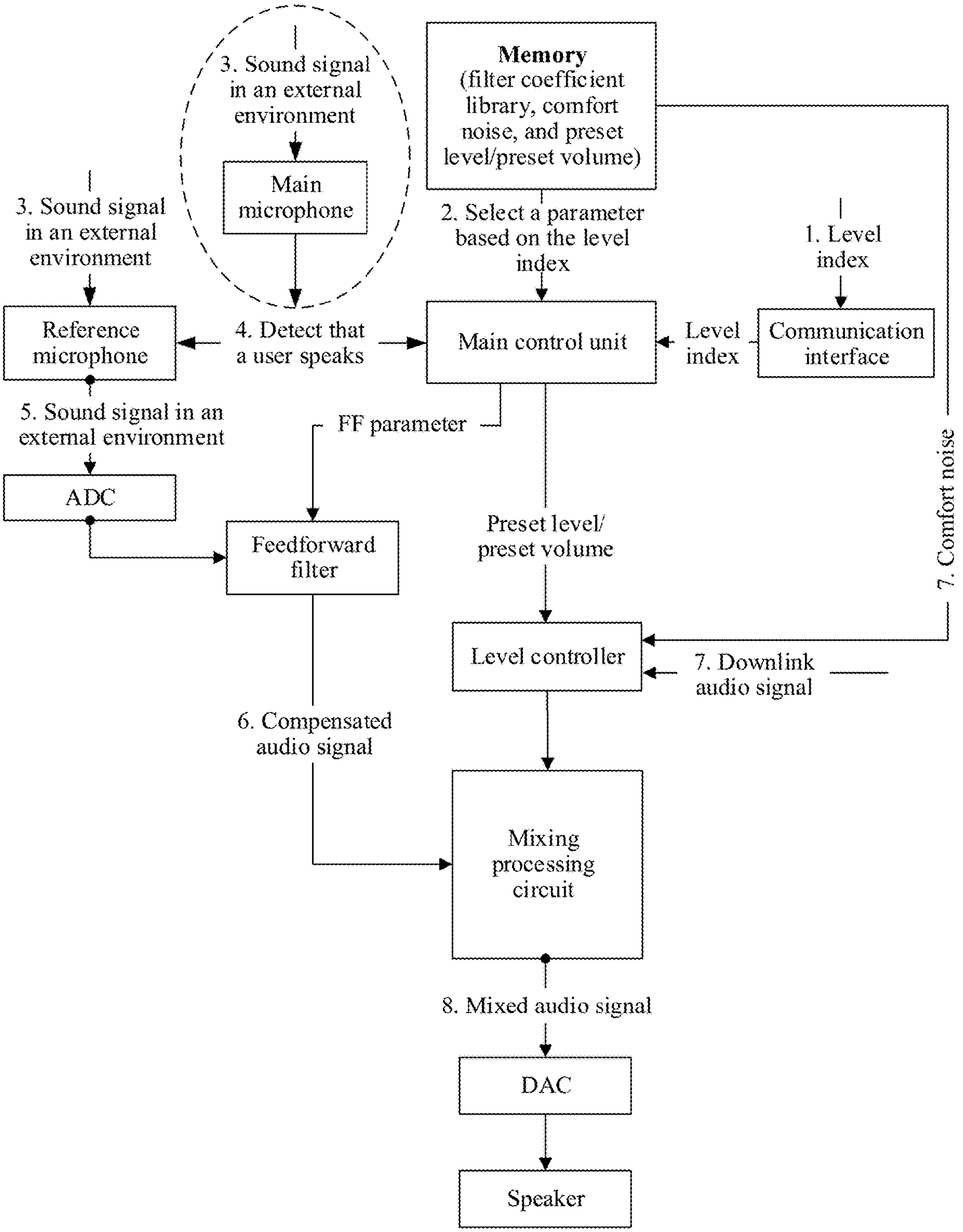
FIG. 9 is a schematic flowchart of another method for reducing or eliminating an occlusion effect of an earphone according to an embodiment of this application.

Based on the structure shown in FIG. 8, the following continues to describe an OR implementation method provided in an embodiment of this application. FIG. 9 is a schematic flowchart of another method for reducing or eliminating an occlusion effect of an earphone according to an embodiment of this application. The method may be applied, for example, to an earphone having a reference microphone and a speaker, and the earphone is in a state of being worn by a user. Related descriptions of the method are as follows:

In S1, a communication interface receives a level index used to indicate a degree of occlusion effect elimination (OR).

For example, the level index may be set by the user on a control interface of a noise reduction application APP of a smartphone, and the level index may be transmitted to a communication interface of the earphone by using a Bluetooth link. For a related implementation, further refer to related descriptions in the embodiment in FIG. 6 or FIG. 7. Details are not described herein again.

In S2, a main control unit selects, from a filter coefficient library in a memory based on the level index, a working parameter corresponding to the level index, including a filter parameter of a feedforward filter (FF parameter for short). The main control unit further configures the FF parameter for the feedforward filter. In addition, in a possible embodiment, the main control unit may further determine playing volume of a downlink audio signal based on the level index. In a possible embodiment, the main control unit may further determine a playing level of comfort noise based on the level index.

The filter coefficient library may include a correspondence between a plurality of groups of level indexes and an FF parameter. A value of the FF parameter may be related to a degree of matching between the user's auditory canal and the earphone. Optionally, the filter coefficient library may be obtained by collecting statistics about relationships between various types of auditory canals of users and the FF parameter. The value of the FF parameter may alternatively be related to an environment in which the user is currently located (for example, a noisy scenario, a quiet scenario, a street scenario, an office scenario, a motion scenario, a still scenario, a speaking scenario, or a non-speaking scenario). Optionally, the filter coefficient library may alternatively be obtained by collecting statistics about relationships between various environment types and the FF parameter. In an optional case, a plurality of adjacent level indexes may correspond to a same FF parameter. For example, a level index within a first range corresponds to a first FF parameter, and a level index within a second range corresponds to a second FF parameter.

In a possible embodiment of S3, the reference microphone captures an audio in an external environment (for example, a sound signal of the speaking user, or noise), and provides the audio to the main control unit for analysis. Correspondingly, in S4, the main control unit recognizes, based on the audio, whether the user speaks. For example, the main control unit performs voice activity detection (VAD) by using the audio provided by the reference microphone. When a VAD output is 1, it is determined that the user wearing the earphone speaks. When a VAD output is not 1, it is determined that the user wearing the earphone does not speak.

In another possible embodiment of S3, a main microphone may also capture an audio in an external environment (for example, a sound signal of the speaking user, or noise), and provide the audio to the main control unit for analysis. Correspondingly, in S4, the main control unit recognizes, based on the audio, whether the user speaks. For example, the main control unit performs VAD by using the audio provided by the main microphone. When a VAD output is 1, it is determined that the user wearing the earphone speaks. When a VAD output is not 1, it is determined that the user wearing the earphone does not speak.

In another possible embodiment, beamforming may be performed by using the main microphone and the reference microphone in advance, so that a beam points to a mouth direction of the user wearing the earphone. When the user speaks, a sound signal is captured by using the main microphone and/or the reference microphone in S3, and then, in S4, the main control unit performs VAD based on the sound signal captured by the main microphone and/or the reference microphone. When a VAD output is 1, it is determined that the user wearing the earphone speaks. When a VAD output is not 1, it is determined that the user wearing the earphone does not speak.

When it is determined through S4 that the user speaks, the main control unit may further start an OR procedure. Details are as follows:

In S5, the reference microphone sends a sound signal propagated in the air and captured in real time to the feedforward filter. It should be understood that the signal processed by the feedforward filter is an electrical signal, and the sound signal captured by the reference microphone is an analog signal. Optionally, before the feedforward filter filters the sound signal propagated in the air, an ADC converts the sound signal into an electrical signal.

In S6, the feedforward filter performs, based on the configured FF parameter, filtering processing on the sound signal captured by the reference microphone, and enables a hear through (HT) function, to enhance the sound signal propagated in the air to the auditory canal and obtain a to-be-compensated sound signal.

Optionally, in a possible embodiment, when a downlink audio signal exists, in S7, a level controller may further adjust volume of the downlink audio signal based on preset volume corresponding to the level index. In S8, a mixing processing circuit performs mixing processing on the downlink audio signal adjusted by the level controller and the to-be-compensated sound signal obtained in S6, to obtain a mixed audio signal. ADAC converts the mixed audio signal from an electrical signal to an analog signal, and the speaker plays the analog signal of the mixed audio signal to the user's auditory canal.

Optionally, in another possible embodiment, when comfort noise exists, in S7, the level controller may further increase volume of the comfort noise based on a preset level corresponding to the level index. In S8, the mixing processing circuit performs mixing processing on the comfort noise adjusted by the level controller and the to-be-compensated audio signal obtained in S6, to obtain a mixed audio signal. The DAC converts the mixed audio signal from an electrical signal to an analog signal, and the speaker plays the analog signal to the user's auditory canal.

For another example, in a possible implementation, if the earphone has a downlink audio signal, a level of the downlink audio signal may be calculated and compared with a given threshold (LEVEL_OCCLUSION); and if the level of the downlink signal is less than the given threshold (LEVEL_OCCLUSION), the level of the downlink audio signal is increased, that is, volume of the downlink audio signal is increased, to suppress the occlusion effect. If the earphone has no downlink audio signal, the comfort noise may be output to implement OR, and the level of the comfort noise may be set based on the level index. Alternatively, if the earphone has no downlink audio signal, the FF filter parameter may be configured based on the level index to transparently transmit the user's sound, so that the earphone works in an HT mode for transparent transmission of ambient sound.

It can be learned that, in this embodiment of this application, the mixed audio signal includes the to-be-compensated signal. When there is a requirement for playing the downlink audio signal or comfort noise, the mixed audio signal may further include the downlink audio signal or comfort noise. When the user speaks, a small portion of the sound signal propagated in the air is propagated to the user's auditory canal through a gap between the earphone and the auditory canal or a gap in another form, and the small portion of the sound signal is superimposed on the to-be-compensated signal played by using the speaker. In this way, the user's sound signal in the air propagation path is enhanced or reproduced, and the sound signal in the air propagation path is transparently transmitted to the user's auditory canal. In addition, when the user speaks, another portion of the sound signal is propagated by bone conduction to the user's auditory canal. In an optional solution, because the volume of the downlink audio signal is increased or the preset-level comfort noise is played, the downlink audio signal or comfort noise generates a masking effect to weaken or completely mask the sound signal propagated by bone conduction. In other words, the sound signal in the air propagation path is enhanced, and the sound signal in the bone conduction propagation path is weakened. This can greatly reduce or even eliminate the occlusion effect when the user speaks. In this way, the user can hear the user's own sound more realistically and naturally without distortion, and user experience is improved.

Figure 10:
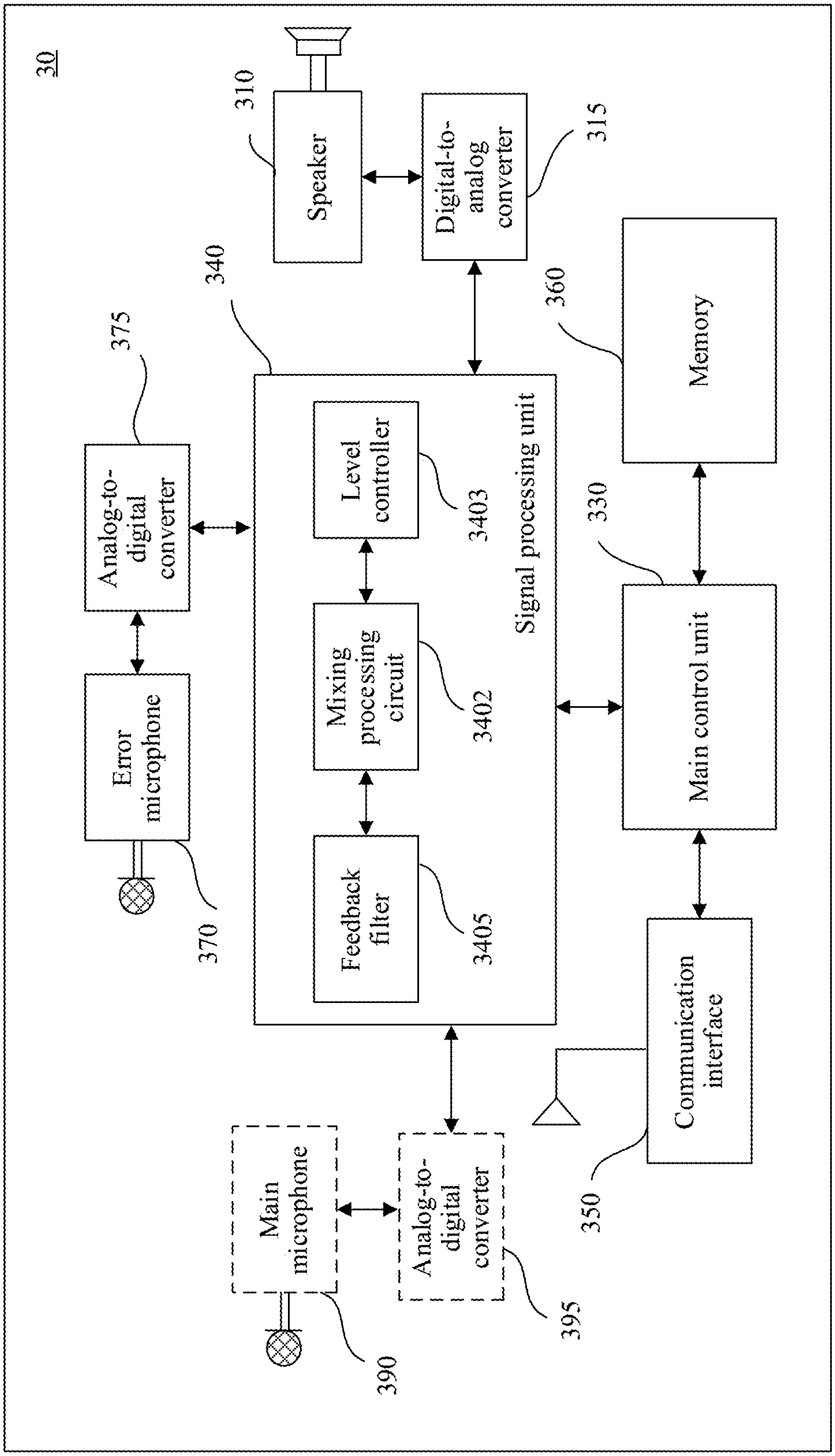
FIG. 10 is a schematic diagram of a structure of another earphone according to an embodiment of this application.

FIG. 10 is a schematic diagram of a structure of another earphone 30 according to an embodiment of this application. A main difference between the earphone 30 and the earphone 20 in the embodiment in FIG. 8 lies in that a microphone in the earphone includes an error microphone but does not include a reference microphone. As shown in FIG. 10, the earphone 30 includes an error microphone 370, an analog-to-digital converter (ADC) 375 connected to the error microphone 370, a speaker 310, a digital-to-analog converter (DAC) 315 connected to the speaker 310, a main control unit 330, a signal processing unit 340, a memory 360, and a communication interface 350. Optionally, the earphone 30 further includes a main microphone 390 and an analog-to-digital converter 395 connected to the main microphone 390. These hardware components may communicate with each other over one or more communication buses. The main control unit and the signal processing unit may be integrated on one processor chip, or may be on two processor chips that are independent of each other. The signal processing unit 340 may further include a feedback filter 3405. Optionally, the signal processing unit 340 further includes a mixing processing circuit 3402 and a level controller 3403.

In this embodiment of this application, the main control unit 330 may be, for example, configured to control a working time sequence of each component of the earphone, configure a working parameter of each component of the earphone, and analyze, by using an algorithm, data captured by the error microphone 370 or the main microphone 390, to use a corresponding working policy. The memory 360 is further configured to store a filter parameter library, comfort noise, and the like. The main control unit may be configured to select, from the filter parameter library based on a level index received by the communication interface 130, a filter coefficient corresponding to the level index. Optionally, the main control unit is further configured to write the filter coefficient to a location of the filter coefficient corresponding to the feedback filter 3405 in the signal processing unit, thereby configuring the filter. In addition, the main control unit 330 may be further configured to determine volume of a downlink audio signal or a level of comfort noise based on the level index, thereby instructing the level controller 3403 to adjust the volume of the downlink audio signal or the level of the comfort noise. The mixing processing circuit 3402 may be configured to perform mixing processing on a signal processed by the feedback filter 3405, the signal processed by the level controller 3403, and the like, to obtain a mixed audio signal. Further, the mixed audio signal is processed by the digital-to-analog converter 315 and transmitted to the speaker 310 for playing.

A person skilled in the art may understand that the earphone 30 is merely an example provided in this embodiment of this application. In a specific implementation of this application, the earphone 30 may have more or fewer components than those shown, may combine two or more components, or may have different configurations of components. It should be noted that, in an optional case, the foregoing components of the earphone 30 may alternatively be coupled together.

Figure 11:
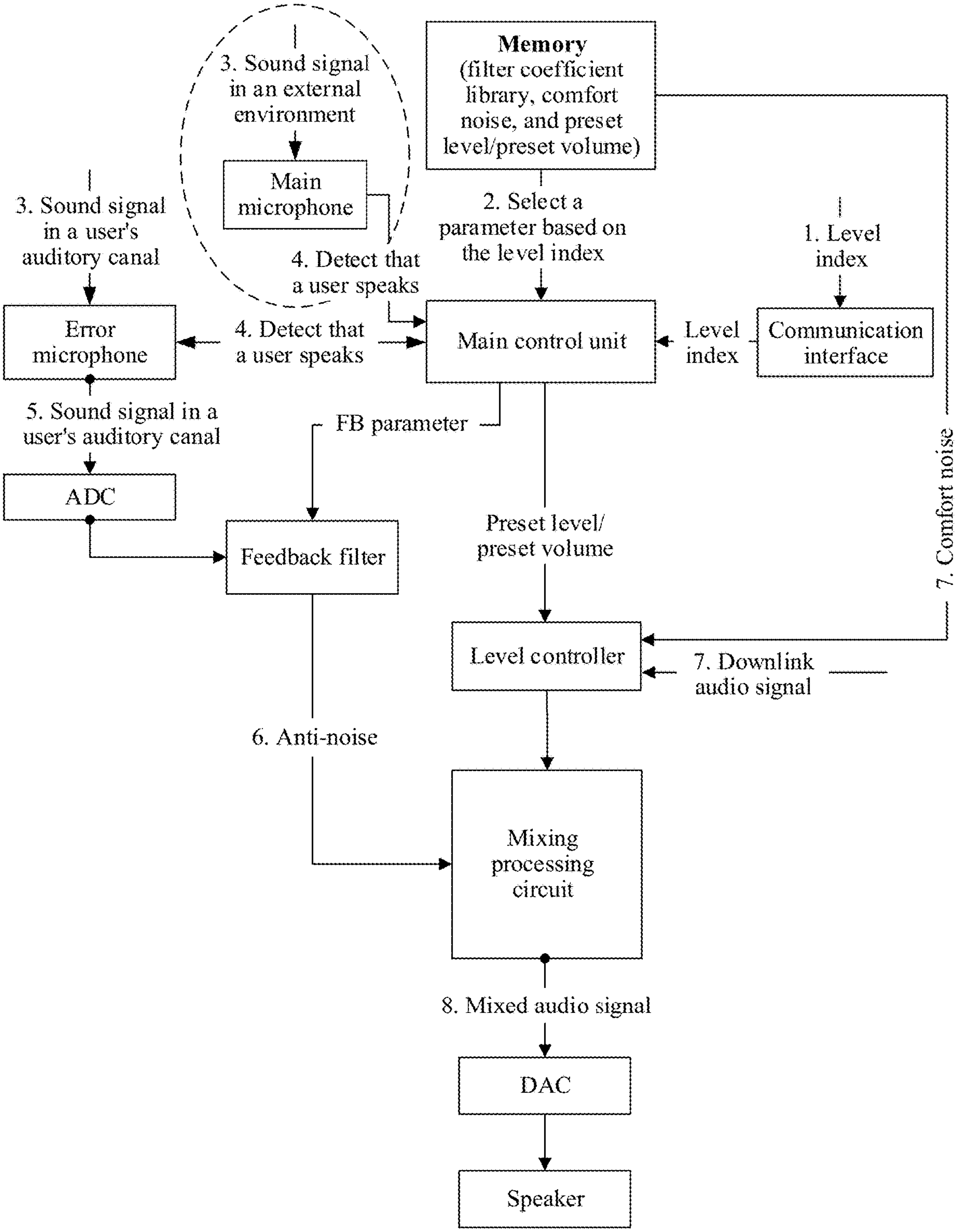
FIG. 11 is a schematic flowchart of another method for reducing or eliminating an occlusion effect of an earphone according to an embodiment of this application.

Based on the structure shown in FIG. 10, the following continues to describe an OR implementation method provided in an embodiment of this application. FIG. 11 is a schematic flowchart of another method for reducing or eliminating an occlusion effect of an earphone according to an embodiment of this application. The method may be applied, for example, to an earphone having an error microphone and a speaker, and the earphone is in a state of being worn by a user. Related descriptions of the method are as follows:

In S1, a communication interface receives a level index used to indicate a degree of occlusion effect elimination (OR). For details, refer to the description of S1 in the embodiment in FIG. 8. Details are not described herein again.

In S2, a main control unit selects, from a filter coefficient library in a memory based on the level index, a working parameter corresponding to the level index, including a filter parameter of a feedback filter (FB parameter for short). The main control unit further configures the FB parameter for the feedback filter. In addition, in a possible embodiment, the main control unit may further determine playing volume of a downlink audio signal based on the level index. In a possible embodiment, the main control unit may further determine a playing level of comfort noise based on the level index.

The filter coefficient library may include a correspondence between a plurality of groups of level indexes and an FB parameter. A value of the FB parameter may be related to a degree of matching between the user's auditory canal and the earphone. Optionally, the filter coefficient library may be obtained by collecting statistics about relationships between various types of auditory canals of users and the FB parameter. The value of the FB parameter may alternatively be related to an environment in which the user is currently located (for example, a noisy scenario, a quiet scenario, a street scenario, an office scenario, a motion scenario, a still scenario, a speaking scenario, or a non-speaking scenario). Optionally, the filter coefficient library may alternatively be obtained by collecting statistics about relationships between various environment types and the FB parameter. In an optional case, a plurality of adjacent level indexes may correspond to a same FB parameter. For example, a level index within a third range corresponds to a first FB parameter, and a level index within a fourth range corresponds to a second FB parameter.

In a possible embodiment of S3, the error microphone captures an audio in the user's auditory canal (for example, a sound signal transmitted to the user's auditory canal by bone conduction when the user speaks, or a sound signal transmitted to the user's auditory canal by vibration of the earphone) and provides the audio to the main control unit for analysis. Correspondingly, in S4, the main control unit recognizes, based on the audio, whether the user speaks. For example, the main control unit performs VAD by using the audio provided by the error microphone. When a VAD output is 1, it is determined that the user wearing the earphone speaks. When a VAD output is not 1, it is determined that the user wearing the earphone does not speak.

In another possible embodiment of S3, a main microphone may capture an audio in an external environment (for example, a sound signal propagated in the air when the user speaks, or noise), and provide the audio to the main control unit for analysis. Correspondingly, in S4, the main control unit recognizes, based on the audio, whether the user speaks. For example, the main control unit performs VAD by using the audio provided by the main microphone. When a VAD output is 1, it is determined that the user wearing the earphone speaks. When a VAD output is not 1, it is determined that the user wearing the earphone does not speak.

When it is determined through S4 that the user speaks, the main control unit may further start an OR procedure. Details are as follows:

In S5, the error microphone sends a sound signal captured in the user's auditory canal in real time to the feedback filter. It should be understood that the signal processed by the feedback filter is an electrical signal, and the sound signal captured by the error microphone is an analog signal. Optionally, before the feedback filter filters the sound signal in the user's auditory canal, an ADC converts the sound signal into an electrical signal.

In S6, the feedback filter performs, based on the configured FB parameter, filtering processing on the sound signal captured by the error microphone, to obtain anti-noise signal, where the anti-noise signal is comparable in amplitude and opposite in phase to the sound signal, and therefore weakens or even eliminates the sound signal in the user's auditory canal.

Optionally, in a possible embodiment, when a downlink audio signal exists, in S7, a level controller may further adjust volume of the downlink audio signal based on preset volume corresponding to the level index. In S8, a mixing processing circuit performs mixing processing on the downlink audio signal adjusted by the level controller and the anti-noise signal obtained in S6, to obtain a mixed audio signal. A DAC converts the mixed audio signal from an electrical signal to an analog signal, and the speaker plays the analog signal of the mixed audio signal to the user's auditory canal.

Optionally, in another possible embodiment, when comfort noise exists, in S7, the level controller may further increase volume of the comfort noise based on a preset level corresponding to the level index. In S8, the mixing processing circuit performs mixing processing on the comfort noise adjusted by the level controller and the anti-noise signal obtained in S6, to obtain a mixed audio signal. The DAC converts the mixed audio signal from an electrical signal to an analog signal, and the speaker plays the analog signal of the mixed audio signal to the user's auditory canal.

It can be learned that, in this embodiment of this application, the mixed audio signal includes the anti-noise signal. When there is a requirement for playing the downlink audio signal or comfort noise, the mixed audio signal may further include the downlink audio signal or comfort noise. When the user speaks, a portion of the sound signal is propagated by bone conduction to the user's auditory canal. Because the mixed audio signal includes the anti-noise signal in the portion of the sound signal, the anti-noise signal can greatly weaken or even completely cancel the portion of the sound signal in the user's auditory canal. In addition, the level index is set by the user based on conditions of the user, and the FB parameter corresponding to the level index can match a leakage degree of the user's auditory canal. Therefore, the anti-noise signal obtained based on the FB parameter has an optimal effect in canceling the sound signal in the user's auditory canal for the user wearing the earphone.

In an optional solution, when there is a requirement for playing the downlink audio signal or comfort noise, because the volume of the downlink audio signal is increased or the preset-level comfort noise is played, the downlink audio signal or comfort noise generates a masking effect to further weaken or completely mask the sound signal propagated by bone conduction. This can also reduce or even eliminate the occlusion effect when the user speaks. In this way, the user can hear the user's own sound more realistically and naturally without distortion, and user experience is improved.

Figure 12:
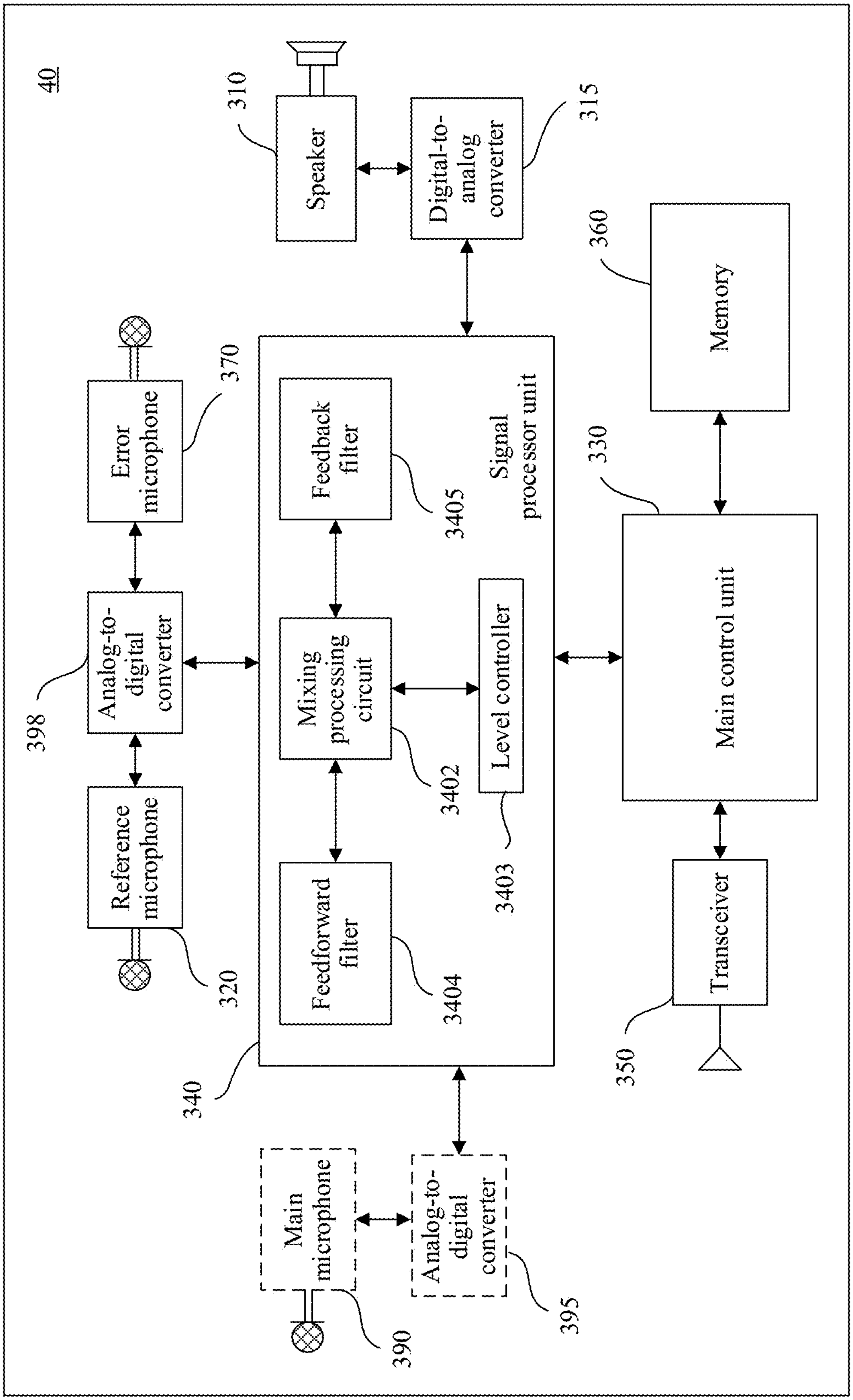
FIG. 12 is a schematic diagram of a structure of another earphone according to an embodiment of this application.

FIG. 12 is a schematic diagram of a structure of another earphone 40 according to an embodiment of this application. A main difference between the earphone 40 and the earphone 20 in the embodiment in FIG. 8 or the earphone 30 in the embodiment in FIG. 10 lies in that a microphone in the earphone includes both a reference microphone and an error microphone. As shown in FIG. 12, the earphone 40 includes a reference microphone 320, an error microphone 370, an analog-to-digital converter (ADC) 398 connected to the reference microphone 320 and the error microphone 370, a speaker 310, a digital-to-analog converter (DAC) 315 connected to the speaker 310, a main control unit 330, a signal processing unit 340, a memory 360, and a communication interface 350. Optionally, the earphone 40 further includes a main microphone 390 and an analog-to-digital converter 395 connected to the main microphone 390. These hardware components may communicate with each other over one or more communication buses. The main control unit and the signal processing unit may be integrated on one processor chip, or may be on two processor chips that are independent of each other. The signal processing unit 340 may further include a feedforward filter 3404 and a feedback filter 3405. Optionally, the signal processing unit 340 further includes a mixing processing circuit 3402 and a level controller 3403.

In this embodiment of this application, the main control unit 330 may be, for example, configured to control a working time sequence of each component of the earphone, configure a working parameter of each component of the earphone, and analyze, by using an algorithm, data captured by the reference microphone 320, the error microphone 370, or the main microphone 390, to use a corresponding working policy. The memory 360 is further configured to store a filter parameter library, comfort noise, and the like. The main control unit may be configured to select, from the filter parameter library based on a level index received by the communication interface 130, a filter coefficient corresponding to the level index. Optionally, the main control unit is further configured to write the filter coefficient to a location of the filter coefficient corresponding to the feedforward filter 3404 and a location of the filter coefficient corresponding to the feedback filter 3405 in the signal processing unit, thereby configuring each filter. In addition, the main control unit 330 may be further configured to determine volume of a downlink audio signal or a level of comfort noise based on the level index, thereby instructing the level controller 3403 to adjust the volume of the downlink audio signal or the level of the comfort noise. The mixing processing circuit 3402 may be configured to perform mixing processing on a signal processed by the feedforward filter 3404, a signal processed by the feedback filter 3405, the signal processed by the level controller 3403, and the like, to obtain a mixed audio signal. Further, the mixed audio signal is processed by the digital-to-analog converter 315 and transmitted to the speaker 310 for playing.

A person skilled in the art may understand that the earphone 40 is merely an example provided in this embodiment of this application. In a specific implementation of this application, the earphone 40 may have more or fewer components than those shown, may combine two or more components, or may have different configurations of components. It should be noted that, in an optional case, the foregoing components of the earphone 40 may alternatively be coupled together.

Figure 13:
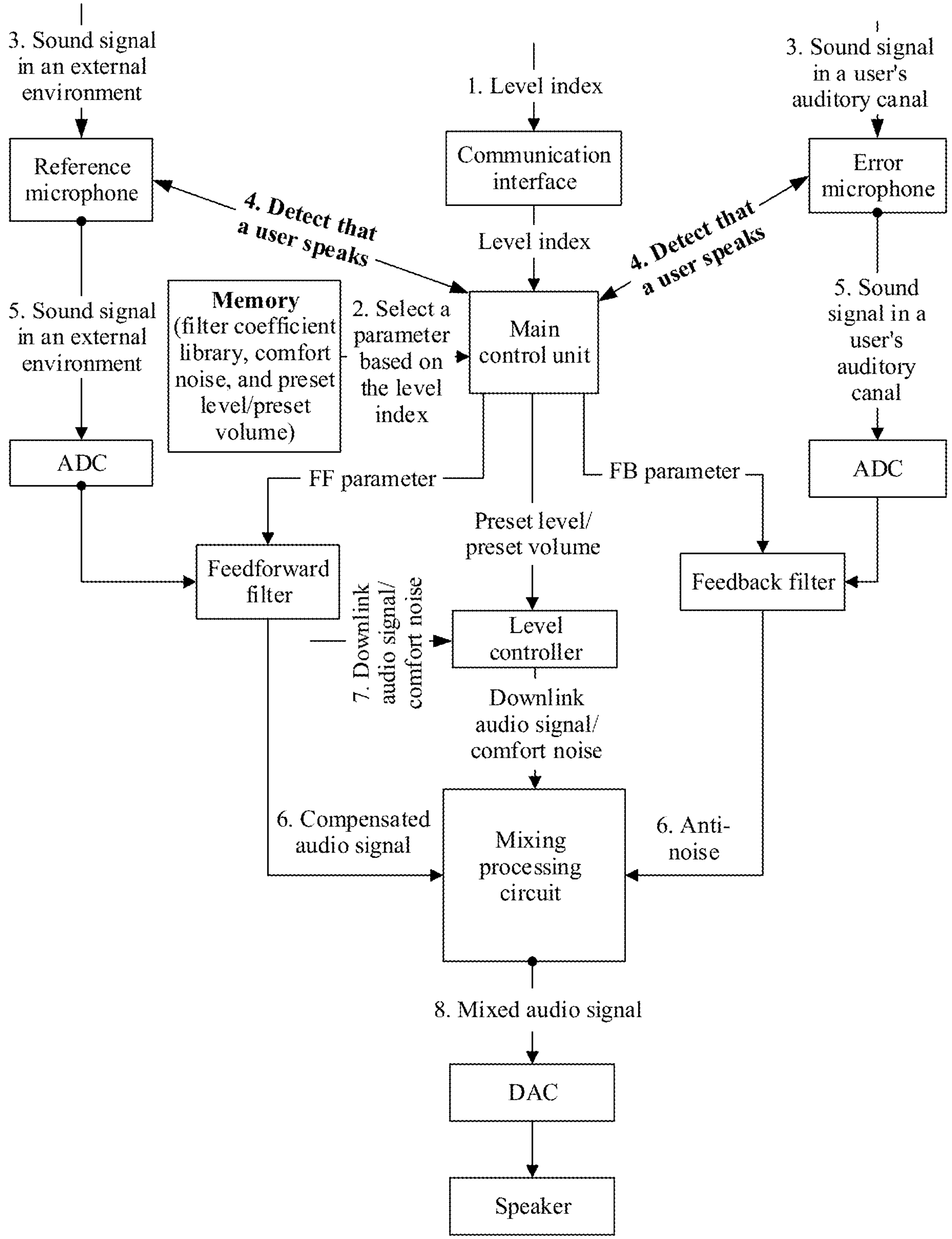
FIG. 13 is a schematic flowchart of another method for reducing or eliminating an occlusion effect of an earphone according to an embodiment of this application.

Based on the structure shown in FIG. 12, the following continues to describe an OR implementation method provided in an embodiment of this application. FIG. 13 is a schematic flowchart of another method for reducing or eliminating an occlusion effect of an earphone according to an embodiment of this application. The method may be applied, for example, to an earphone having a reference microphone, an error microphone, and a speaker, and the earphone is in a state of being worn by a user. Related descriptions of the method are as follows:

In S1, a communication interface receives a level index used to indicate a degree of occlusion effect elimination (OR). For details, refer to the description of S1 in the embodiment in FIG. 8. Details are not described herein again.

In S2, a main control unit selects, from a filter coefficient library in a memory based on the level index, a working parameter corresponding to the level index, including a combination of a filter parameter of a feedforward filter (FF parameter for short) and a filter parameter of a feedback filter (FB parameter for short). The main control unit further configures the FF parameter and the FB parameter for the feedforward filter and the feedback filter respectively. In addition, in a possible embodiment, the main control unit may further determine playing volume of a downlink audio signal based on the level index. In a possible embodiment, the main control unit may further determine a playing level of comfort noise based on the level index.

The filter coefficient library may include a correspondence between a plurality of groups of level indexes and the combination of the FF parameter and the FB parameter. Values of the combination of the FF parameter and the FB parameter may be related to a degree of matching between the user's auditory canal and the earphone. Optionally, the filter coefficient library may be obtained by collecting statistics about relationships between various types of auditory canals of users and the combination of the FF parameter and the FB parameter. The values of the combination of the FF parameter and the FB parameter may alternatively be related to an environment in which the user is currently located (for example, a noisy scenario, a quiet scenario, a street scenario, an office scenario, a motion scenario, a still scenario, a speaking scenario, or a non-speaking scenario). Optionally, the filter coefficient library may alternatively be obtained by collecting statistics about relationships between various environment types and the combination of the FF parameter and the FB parameter.

In a possible embodiment of S3, a corresponding sound signal may be captured by using the reference microphone, the error microphone, or a main microphone, and the sound signal is provided to the main control unit for analysis. In S4, the main control unit recognizes, based on the sound signal captured by the reference microphone, the error microphone, or the main microphone, whether the user speaks. For example, the main control unit performs VAD by using the sound signal captured by the reference microphone, the error microphone, or the main microphone. When a VAD output is 1, it is determined that the user wearing the earphone speaks. When a VAD output is not 1, it is determined that the user wearing the earphone does not speak.

In another possible embodiment, beamforming may be performed by using the main microphone and the reference microphone in advance, so that a beam points to a mouth direction of the user wearing the earphone. When the user speaks, a sound signal is captured by using the main microphone and/or the reference microphone in S3, and then, in S4, the main control unit performs VAD based on the sound signal captured by the main microphone and/or the reference microphone. When a VAD output is 1, it is determined that the user wearing the earphone speaks. When a VAD output is not 1, it is determined that the user wearing the earphone does not speak.

When it is determined through S4 that the user speaks, the main control unit may further start an OR procedure. Details are as follows:

In S5, the reference microphone sends a sound signal propagated in the air and captured in real time to the feedforward filter, and the error microphone sends, to the feedback filter, a sound signal that is in the user's auditory canal and is captured in real time. It should be understood that, before the feedforward filter filters the sound signal propagated in the air, an ADC converts the sound signal into an electrical signal. Before the feedback filter filters the sound signal in the user's auditory canal, the ADC also converts the audio signal into an electrical signal.

In S6, the feedforward filter performs, based on the configured FF parameter, filtering processing on the sound signal captured by the reference microphone, and enables a hear through (HT) function, to enhance sound propagated in the air to the auditory canal and obtain a to-be-compensated sound signal. The feedback filter performs, based on the configured FB parameter, filtering processing on the sound signal captured by the error microphone, to obtain anti-noise signal, where the anti-noise signal is comparable in amplitude and opposite in phase to the sound signal, and therefore weakens or even eliminates the sound signal in the user's auditory canal.

Optionally, in a possible embodiment, when a downlink audio signal exists, in S7, a level controller may further adjust volume of the downlink audio signal based on preset volume corresponding to the level index. In S8, a mixing processing circuit performs mixing processing on the downlink audio signal adjusted by the level controller and the to-be-compensated sound signal and the anti-noise signal obtained in S6, to obtain a mixed audio signal. A DAC converts the mixed audio signal from an electrical signal to an analog signal, and the speaker plays the analog signal of the mixed audio signal to the user's auditory canal.

Optionally, in another possible embodiment, when comfort noise exists, in S7, the level controller may further increase volume of the comfort noise based on a preset level corresponding to the level index. In S8, the mixing processing circuit performs mixing processing on the comfort noise adjusted by the level controller, and the to-be-compensated sound signal and the anti-noise signal obtained in S6, to obtain a mixed audio signal. The DAC converts the mixed audio signal from an electrical signal to an analog signal, and the speaker plays the analog signal of the mixed audio signal to the user's auditory canal.

It can be learned that, in this embodiment of this application, the mixed audio signal includes the anti-noise signal. When there is a requirement for playing the downlink audio signal or comfort noise, the mixed audio signal may further include the downlink audio signal or comfort noise. When the user speaks, a small portion of the sound signal propagated in the air is propagated to the user's auditory canal through a gap between the earphone and the auditory canal or a gap in another form, and the small portion of the sound signal is superimposed on the to-be-compensated sound signal played by using the speaker. In this way, the user's sound signal in the air propagation path is enhanced or reproduced, and the sound signal in the air propagation path is transparently transmitted to the user's auditory canal. In addition, a portion of the sound signal is propagated by bone conduction to the user's auditory canal. Because the mixed audio signal includes the anti-noise signal in the portion of the sound signal, the anti-noise signal can greatly weaken or even completely cancel the portion of the sound signal in the user's auditory canal. Therefore, the two can be combined to eliminate the occlusion effect when the user speaks. In this way, the user can hear the user's own sound more realistically and naturally without distortion, and user experience is improved.

In an optional solution, when there is a requirement for playing the downlink audio signal or comfort noise, because the volume of the downlink audio signal is increased or the preset-level comfort noise is played, the downlink audio signal or comfort noise generates a masking effect to further weaken or completely mask the sound signal propagated by bone conduction. This can further ensure that the occlusion effect is eliminated when the user speaks.

Figure 14:
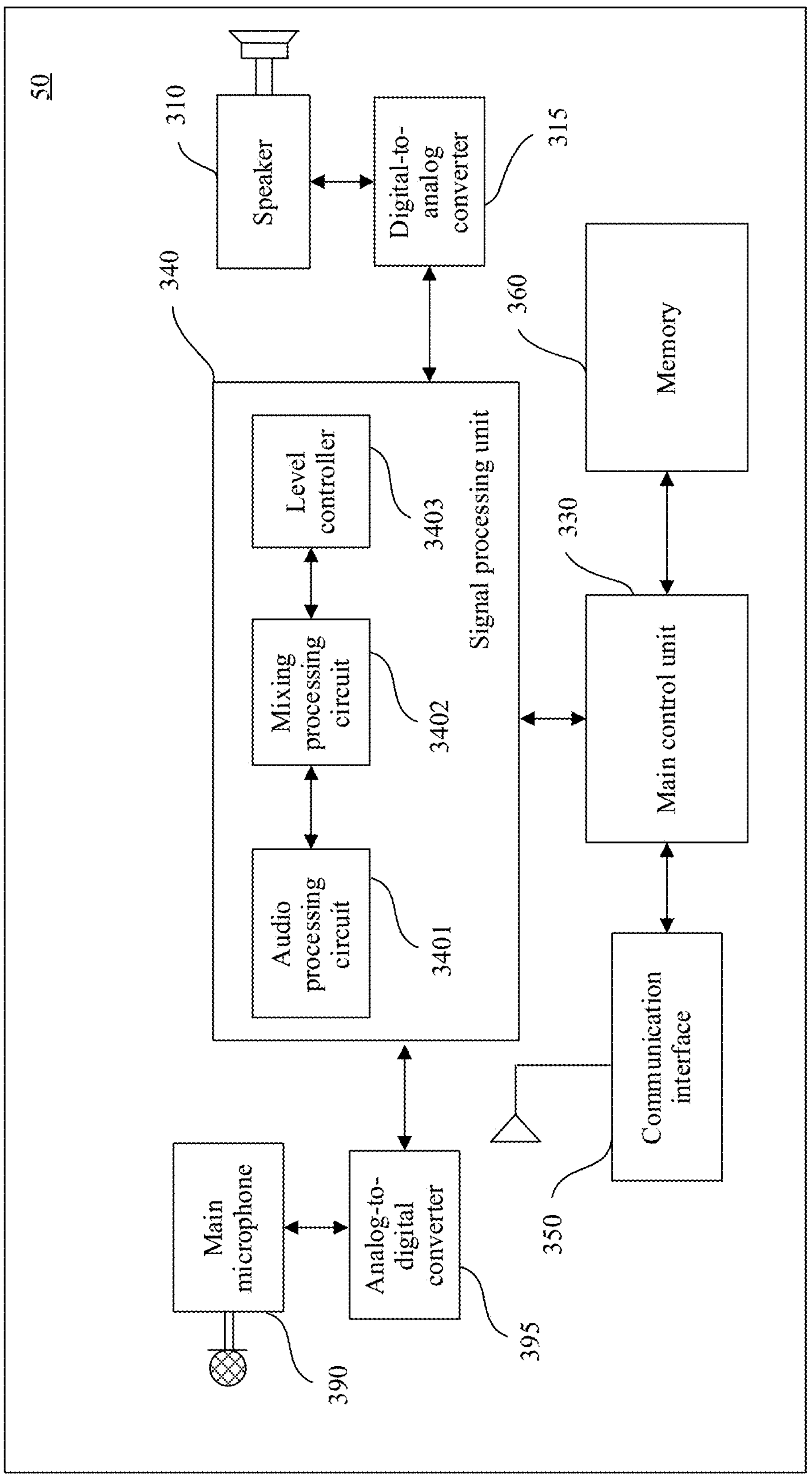
FIG. 14 is a schematic diagram of a structure of another earphone according to an embodiment of this application.

FIG. 14 is a schematic diagram of a structure of another earphone 50 according to an embodiment of this application. A main difference between the earphone 50 and the earphone 20 in the embodiment in FIG. 8, the earphone 30 in the embodiment in FIG. 10, or the earphone 40 in the embodiment in FIG. 12 lies in that a microphone in the earphone includes only a main microphone but does not include a reference microphone and an error microphone. As shown in FIG. 14, the earphone 40 includes a main microphone 390, an analog-to-digital converter 395 connected to the main microphone 390, a speaker 310, a digital-to-analog converter (DAC) 315 connected to the speaker 310, a main control unit 330, a signal processing unit 340, a memory 360, and a communication interface 350. These hardware components may communicate with each other over one or more communication buses. The main control unit and the signal processing unit may be integrated on one processor chip, or may be on two processor chips that are independent of each other. The signal processing unit 340 may further include an audio processing circuit 3401, a mixing processing circuit 3402, and a level controller 3403.

In this embodiment of this application, the main control unit 330 may be, for example, configured to control a working time sequence of each component of the earphone, configure a working parameter of each component of the earphone, and analyze, by using an algorithm, data captured by the main microphone 390, to use a corresponding working policy. The memory 360 is further configured to store comfort noise, and the like. The main control unit may be configured to determine volume of a downlink audio signal or a level of comfort noise based on a level index received by the communication interface 130, thereby instructing the level controller 3403 to adjust the volume of the downlink audio signal or the level of the comfort noise. The audio processing circuit 3401 can be configured to process a sound signal captured by the main microphone 390 to obtain a to-be-compensated sound signal, and play the to-be-compensated sound signal by using the speaker, to transparently transmit the sound signal to a user's auditory canal. The mixing processing circuit 3402 may be configured to perform mixing processing on the signal processed by the audio processing circuit 3401, the signal processed by the level controller 3403, and the like, to obtain a mixed audio signal. Further, the mixed audio signal is processed by the digital-to-analog converter 315 and transmitted to the speaker 310 for playing.

A person skilled in the art may understand that the earphone 50 is merely an example provided in this embodiment of this application. In a specific implementation of this application, the earphone 50 may have more or fewer components than those shown, may combine two or more components, or may have different configurations of components. It should be noted that, in an optional case, the foregoing components of the earphone 50 may alternatively be coupled together.

Figure 15:
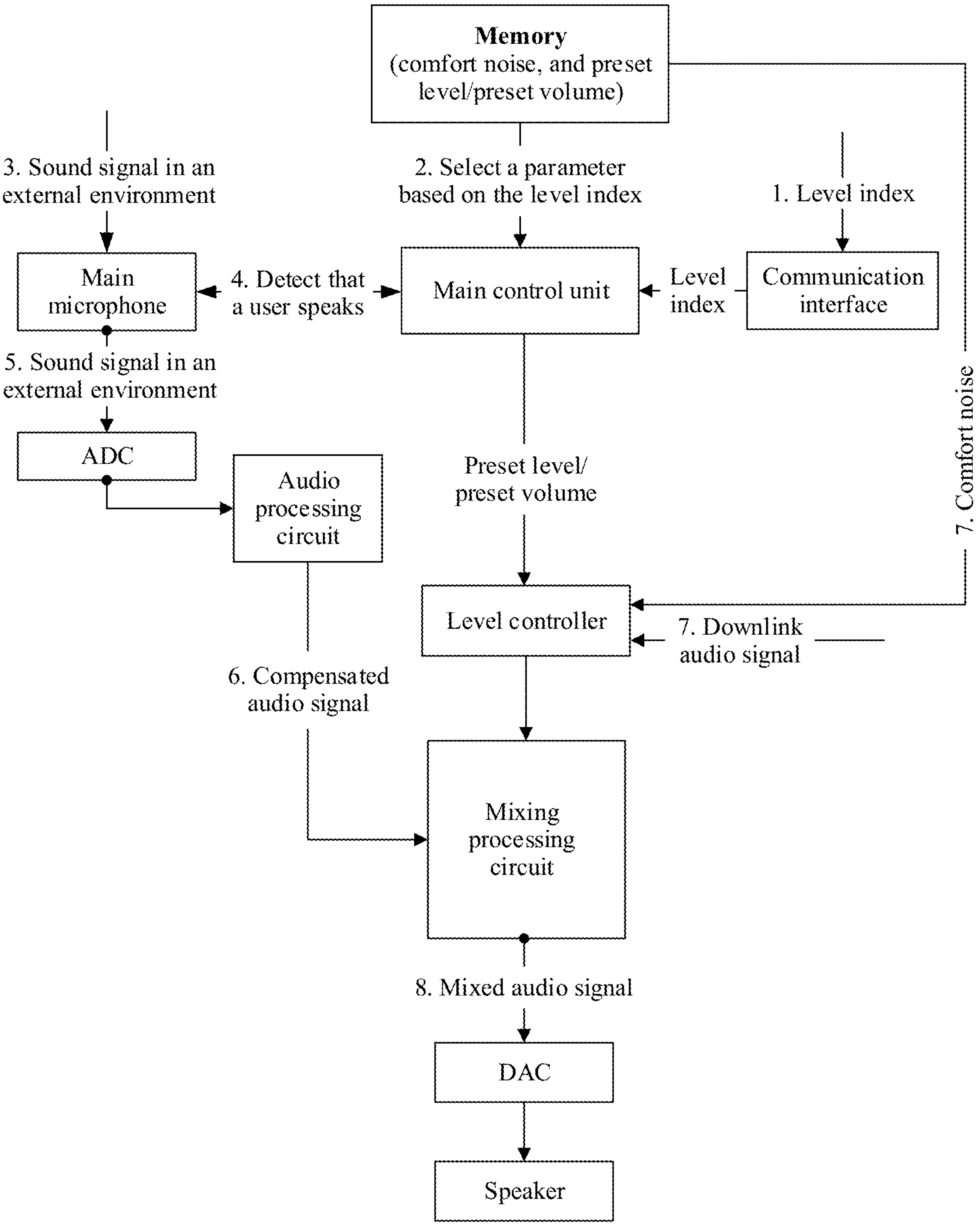
FIG. 15 is a schematic flowchart of another method for reducing or eliminating an occlusion effect of an earphone according to an embodiment of this application.

Based on the structure shown in FIG. 14, the following continues to describe an OR implementation method provided in an embodiment of this application. FIG. 15 is a schematic flowchart of another method for reducing or eliminating an occlusion effect of an earphone according to an embodiment of this application. The method may be applied, for example, to an earphone having a main microphone and a speaker, and the earphone is in a state of being worn by a user. Related descriptions of the method are as follows:

In S1, a communication interface receives a level index used to indicate a degree of occlusion effect elimination (OR).

Figure 16:
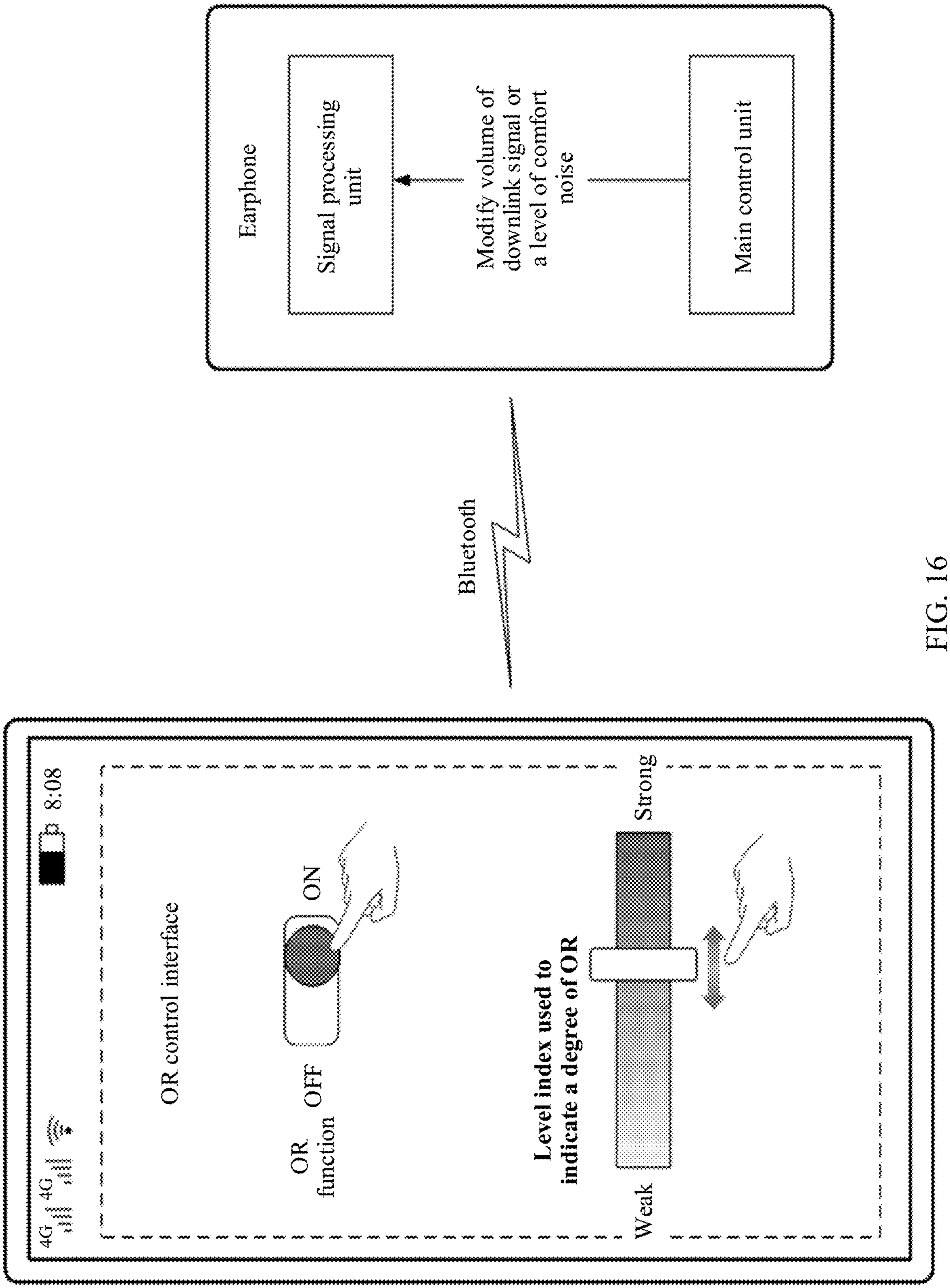
FIG. 16 is a schematic diagram of a control interface of an example application according to an embodiment of this application.

For example, the level index may be set by the user on a control interface of a noise reduction application APP of a smartphone, and the level index may be transmitted to a communication interface of the earphone by using a Bluetooth link. FIG. 16 is a control interface of another example application (APP) according to an embodiment of this application. In the example in FIG. 16, the control interface may include a switch control module and a level index adjustment control. The user may set the level index of OR by dragging a location of an adjustment bar on the level index adjustment control within a level index range. When the user stops dragging, the APP records the location of the indication adjustment bar, obtains a level index value corresponding to the location, and transmits the level index to the earphone by using Bluetooth or another wireless link.

In S2, as shown in FIG. 16, a main control unit may further indicate playing volume of a downlink audio signal to a signal processing unit based on the level index, or a main control unit may further indicate a playing level of comfort noise to a signal processing unit based on the level index.

In S3, the main microphone may capture an audio in an external environment (for example, a sound signal of the speaking user, or noise), and provide the audio to the main control unit for analysis. Correspondingly, in S4, the main control unit recognizes, based on the audio, whether the user speaks. For example, the main control unit performs VAD by using the audio provided by the main microphone. When a VAD output is 1, it is determined that the user wearing the earphone speaks. When a VAD output is not 1, it is determined that the user wearing the earphone does not speak.

When it is determined through S4 that the user speaks, the main control unit may further start an OR procedure. Details are as follows:

In S5, the main microphone sends a sound signal propagated in the air and captured in real time to an audio processing circuit. It should be understood that the signal processed by the audio processing circuit is an electrical signal, and the sound signal captured by the main microphone is an analog signal, and an ADC converts the sound signal into an electrical signal.

In S6, the audio processing circuit processes a sound signal captured by the reference microphone, for example, adjusts volume of the sound signal by multiple levels, or performs filtering processing or other processing on the sound signal, to obtain a to-be-compensated sound signal. The to-be-compensated sound signal can also enhance sound propagated in the air to an auditory canal.

Optionally, in a possible embodiment, when a downlink audio signal exists, in S7, a level controller may further adjust volume of the downlink audio signal based on preset volume corresponding to the level index. In S8, a mixing processing circuit performs mixing processing on the downlink audio signal adjusted by the level controller and the to-be-compensated audio signal obtained in S6, to obtain a mixed audio signal. A DAC converts the mixed audio signal from an electrical signal to an analog signal, and the speaker plays the analog signal of the mixed audio signal to the user's auditory canal.

Optionally, in another possible embodiment, when comfort noise exists, in S7, the level controller may further increase volume of the comfort noise based on a preset level corresponding to the level index. In S8, the mixing processing circuit performs mixing processing on the comfort noise adjusted by the level controller and the to-be-compensated audio signal obtained in S6, to obtain a mixed audio signal. The DAC converts the mixed audio signal from an electrical signal to an analog signal, and the speaker plays the analog signal of the mixed audio signal to the user's auditory canal.

For another example, in a possible implementation, if the earphone has a downlink audio signal, a level of the downlink audio signal may be calculated and compared with a given threshold (LEVEL_OCCLUSION); and if the level of the downlink signal is less than the given threshold (LEVEL_OCCLUSION), the level of the downlink audio signal is increased, that is, volume of the downlink audio signal is increased, to suppress the occlusion effect. If the earphone has no downlink audio signal, the comfort noise may be output to implement OR, and the level of the comfort noise may be set based on the level index.

It can be learned that, in this embodiment of this application, the mixed audio signal includes the to-be-compensated signal. When there is a requirement for playing the downlink audio signal or comfort noise, the mixed audio signal may further include the downlink audio signal or comfort noise. When the user speaks, a small portion of the sound signal propagated in the air is propagated to the user's auditory canal through a gap between the earphone and the auditory canal or a gap in another form, and the small portion of the sound signal is superimposed on the to-be-compensated signal played by using the speaker. In this way, the user's sound signal in the air propagation path can also be enhanced to some extent, and an effect similar to transparently transmitting the sound signal to the user's auditory canal is achieved. In addition, when the user speaks, another portion of the sound signal is propagated by bone conduction to the user's auditory canal. In an optional solution, because the volume of the downlink audio signal is increased or the preset-level comfort noise is played, the downlink audio signal or comfort noise generates a masking effect to weaken or completely mask the sound signal propagated by bone conduction. In other words, the sound signal in the air propagation path is enhanced, and the sound signal in the bone conduction propagation path is weakened. This can greatly reduce or even eliminate the occlusion effect when the user speaks. In this way, the user can hear the user's own sound more realistically and naturally without distortion, and user experience is improved.

Figure 17:
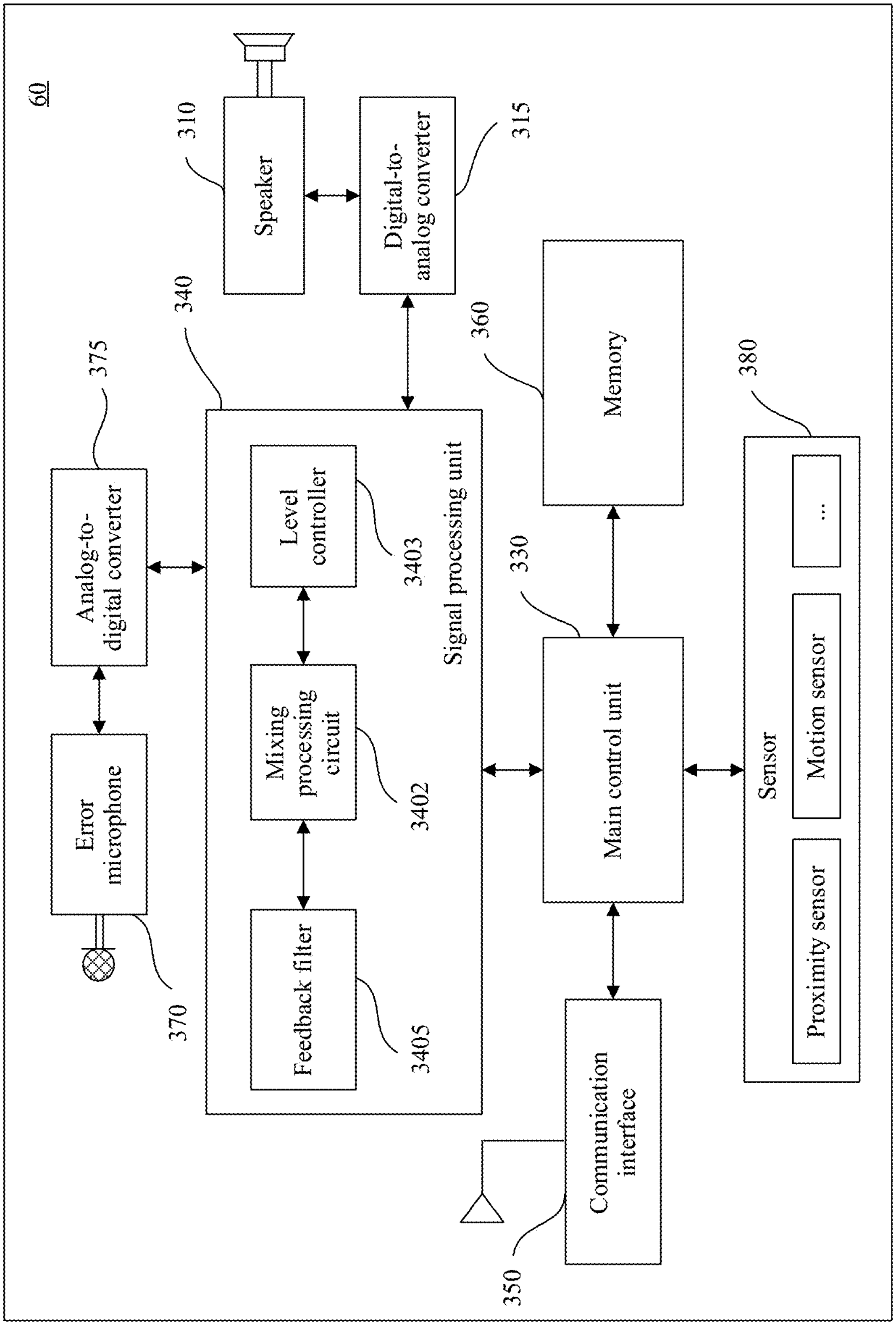
FIG. 17 is a schematic diagram of a structure of another earphone according to an embodiment of this application.

FIG. 17 is a schematic diagram of a structure of another earphone 60 according to an embodiment of this application. A microphone in the earphone 60 includes an error microphone but does not include a reference microphone. A main difference between the earphone 60 and the earphone 30 in the embodiment in FIG. 10 lies in that the earphone 60 further includes a sensor 380. The sensor 380 includes, for example, a motion sensor, configured to detect whether a user is in a motion state. Optionally, the sensor 380 further includes a proximity sensor, configured to detect whether the earphone 60 is in a state of being worn by the user on an ear. For other related hardware of the earphone 60, refer to related descriptions of components of the earphone 30. For brevity of the specification, details are not described herein again.

A person skilled in the art may understand that the earphone 60 is merely an example provided in this embodiment of this application. In a specific implementation of this application, the earphone 60 may have more or fewer components than those shown, may combine two or more components, or may have different configurations of components. It should be noted that, in an optional case, the foregoing components of the earphone 60 may alternatively be coupled together.

Figure 18:
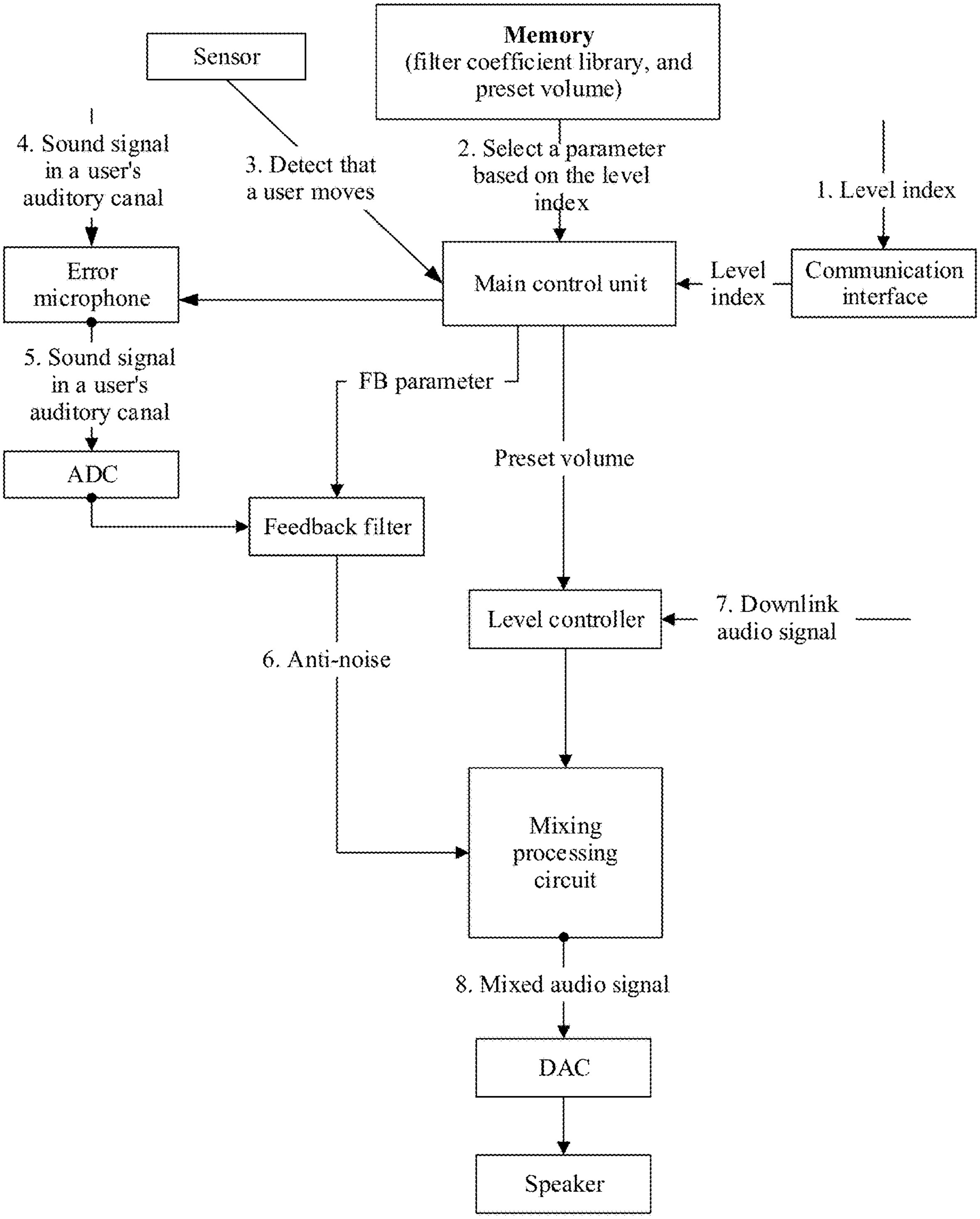
FIG. 18 is a schematic flowchart of another method for reducing or eliminating an occlusion effect of an earphone according to an embodiment of this application.

Based on the structure shown in FIG. 17, the following continues to describe an OR implementation method provided in an embodiment of this application. FIG. 18 is a schematic flowchart of another method for reducing or eliminating an occlusion effect of an earphone according to an embodiment of this application. The method may be applied, for example, to an earphone having a sensor, an error microphone, and a speaker. Related descriptions of the method are as follows:

In S1, a communication interface receives a level index used to indicate a degree of occlusion effect elimination (OR). For specific content, refer to the description of S1 in the embodiment in FIG. 10. Details are not described herein again.

In S2, a main control unit selects, from a filter coefficient library in a memory based on the level index, a working parameter corresponding to the level index, including a filter parameter of a feedback filter (FB parameter for short). The main control unit further configures the FB parameter for the feedback filter. In addition, in a possible embodiment, the main control unit may further determine playing volume of a downlink audio signal based on the level index. In a possible embodiment, the main control unit may further determine a playing level of comfort noise based on the level index. For specific content, refer to the description of S2 in the embodiment in FIG. 10. Details are not described herein again.

In S3, whether a user wearing the earphone is in a motion state may be detected by using the motion sensor in the earphone. The motion sensor can sense motion of the user, and feed back information to the main control unit for analysis. When the main control unit determines that the user is in the motion state, the main control unit may further start an OR procedure.

In this embodiment of this application, the motion sensor may include, for example, at least one of a tri-axis accelerometer, a gyroscope, an inertial sensor, a geomagnetic sensor, a position sensor, a distance sensor, an angle sensor, a pressure sensor, a light sensor, a gravity sensor, a temperature sensor, and the like.

In addition, optionally, if the earphone is further equipped with a proximity sensor, after it is detected that the user is in the motion state, whether the earphone is in a state of being worn by the user may be further detected by using the proximity sensor, and then enabling and disabling of OR is controlled based on a detection result.

Optionally, if the earphone is further equipped with the proximity sensor, whether the earphone is in a state of being worn by the user may be first determined based on the proximity sensor. When the earphone is in the state of being worn by the user, whether the user wearing the earphone is in the motion state is further detected by using the sensor in the earphone, and information is fed back to the main control unit for analysis. When the main control unit determines that the user is in the motion state, the main control unit may further start the OR procedure.

In this embodiment of this application, the proximity sensor may be a component that has a capability of sensing proximity of an object (such as the user's auditory canal). For example, the proximity sensor may be a photoelectric proximity sensor. The proximity sensor recognizes proximity of the object by using a characteristic of sensitivity to the proximate object, and outputs a corresponding switch signal.

When it is determined through S3 that the user is in the motion state, the main control unit may further start the OR procedure. Details are as follows:

In S4, the error microphone captures a sound signal in the user's auditory canal in real time, where the sound signal in the user's auditory canal may be, for example, a sound signal in the user's auditory canal, caused by vibration of the earphone due to motion of the user, shaking of an earphone wire, head turning, or vibration of the earphone generated by external collision or friction when the user wearing the earphone moves.

In S5, the error microphone sends the sound signal captured in the user's auditory canal to the feedback filter. It should be understood that the signal processed by the feedback filter is an electrical signal, and the sound signal captured by the error microphone is an analog signal. Optionally, before the feedback filter filters the sound signal in the user's auditory canal, an ADC converts the sound signal into an electrical signal.

In S6, the feedback filter performs, based on the configured FB parameter, filtering processing on the sound signal captured by the error microphone, to obtain anti-noise signal, where the anti-noise signal is comparable in amplitude and opposite in phase to the sound signal, and therefore weakens or even eliminates the sound signal in the user's auditory canal.

Optionally, in a possible embodiment, when a downlink audio signal exists, in S7, a level controller may further adjust volume of the downlink audio signal based on preset volume corresponding to the level index. In S8, a mixing processing circuit performs mixing processing on the downlink audio signal adjusted by the level controller and the anti-noise signal obtained in S6, to obtain a mixed audio signal, and the speaker plays an analog signal of the mixed audio signal to the user's auditory canal.

Optionally, in another possible embodiment, when comfort noise exists, in S7, the level controller may further increase volume of the comfort noise based on a preset level corresponding to the level index. In S8, the mixing processing circuit performs mixing processing on the comfort noise adjusted by the level controller and the anti-noise signal obtained in S6, to obtain a mixed audio signal, and the speaker plays an analog signal of the mixed audio signal to the user's auditory canal.

It can be learned that, in this embodiment of this application, the mixed audio signal includes the anti-noise signal. When there is a requirement for playing the downlink audio signal or comfort noise, the mixed audio signal may further include the downlink audio signal or comfort noise. When the user moves, the earphone vibrates due to motion of the user, the earphone wire shakes, the user's head turns, or the earphone vibrates due to external collision or friction when the user wearing the earphone moves. The vibration is further transferred to the user's auditory canal, and sound generated by the vibration is reflected to a tympanic membrane in a closed auditory canal space. This may cause an occlusion effect. However, in this embodiment of this application, because the mixed audio signal includes the anti-noise signal of the sound signal in the user's auditory canal, the anti-noise signal in the user's auditory canal can greatly weaken or even completely cancel the portion of the sound signal. This can also reduce or even eliminate the occlusion effect.

In an optional solution, when there is a requirement for playing the downlink audio signal or comfort noise, because the volume of the downlink audio signal is increased or the preset-level comfort noise is played, the downlink audio signal or comfort noise generates a masking effect to further weaken or completely mask the sound signal in the user's auditory canal caused by motion of the user. This can also reduce or even eliminate the occlusion effect, eliminate discomfort of the user, and improve user experience.

Figure 19:
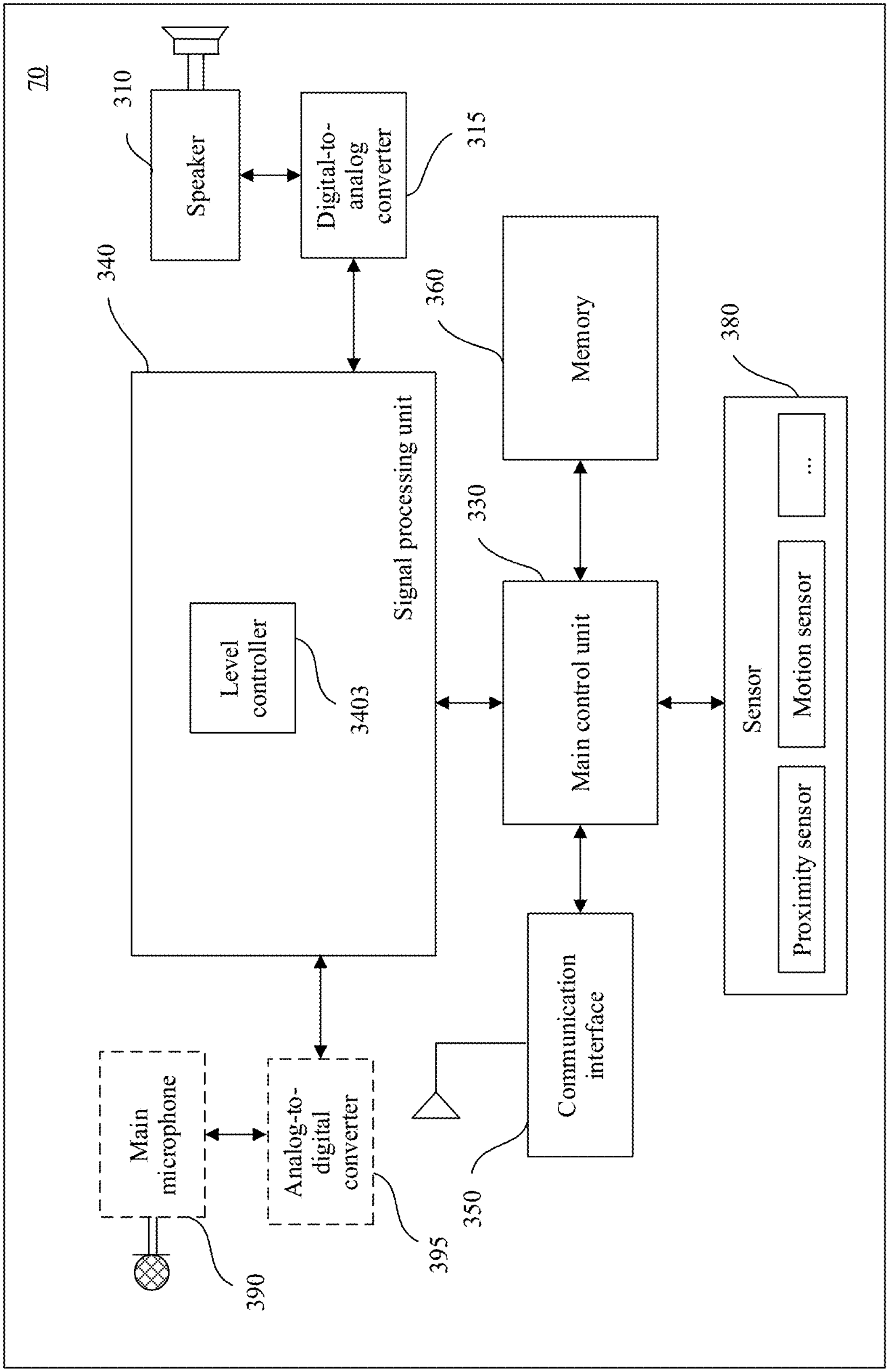
FIG. 19 is a schematic diagram of a structure of another earphone according to an embodiment of this application.

FIG. 19 is a schematic diagram of a structure of another earphone 70 according to an embodiment of this application. The earphone 70 includes a sensor. The sensor 380 includes, for example, a motion sensor, configured to detect whether a user is in a motion state. Optionally, the sensor 380 further includes a proximity sensor, configured to detect whether the earphone 70 is in a state of being worn by the user on an ear. A main difference between the earphone 70 and the earphone 60 in the embodiment in FIG. 17 lies in that a microphone in the earphone 70 does not include a reference microphone and an error microphone. Optionally, the earphone 70 may include a main microphone 390 and an analog-to-digital converter 395 connected to the main microphone 390. A signal processing unit of the earphone 70 includes a level controller 3403, but does not include a feedback filter or a feedforward filter. For other related hardware of the earphone 70, refer to related descriptions of components of the earphone 60. For brevity of the specification, details are not described herein again.

A person skilled in the art may understand that the earphone 70 is merely an example provided in this embodiment of this application. In a specific implementation of this application, the earphone 70 may have more or fewer components than those shown, may combine two or more components, or may have different configurations of components. It should be noted that, in an optional case, the foregoing components of the earphone 70 may alternatively be coupled together.

Figure 20:
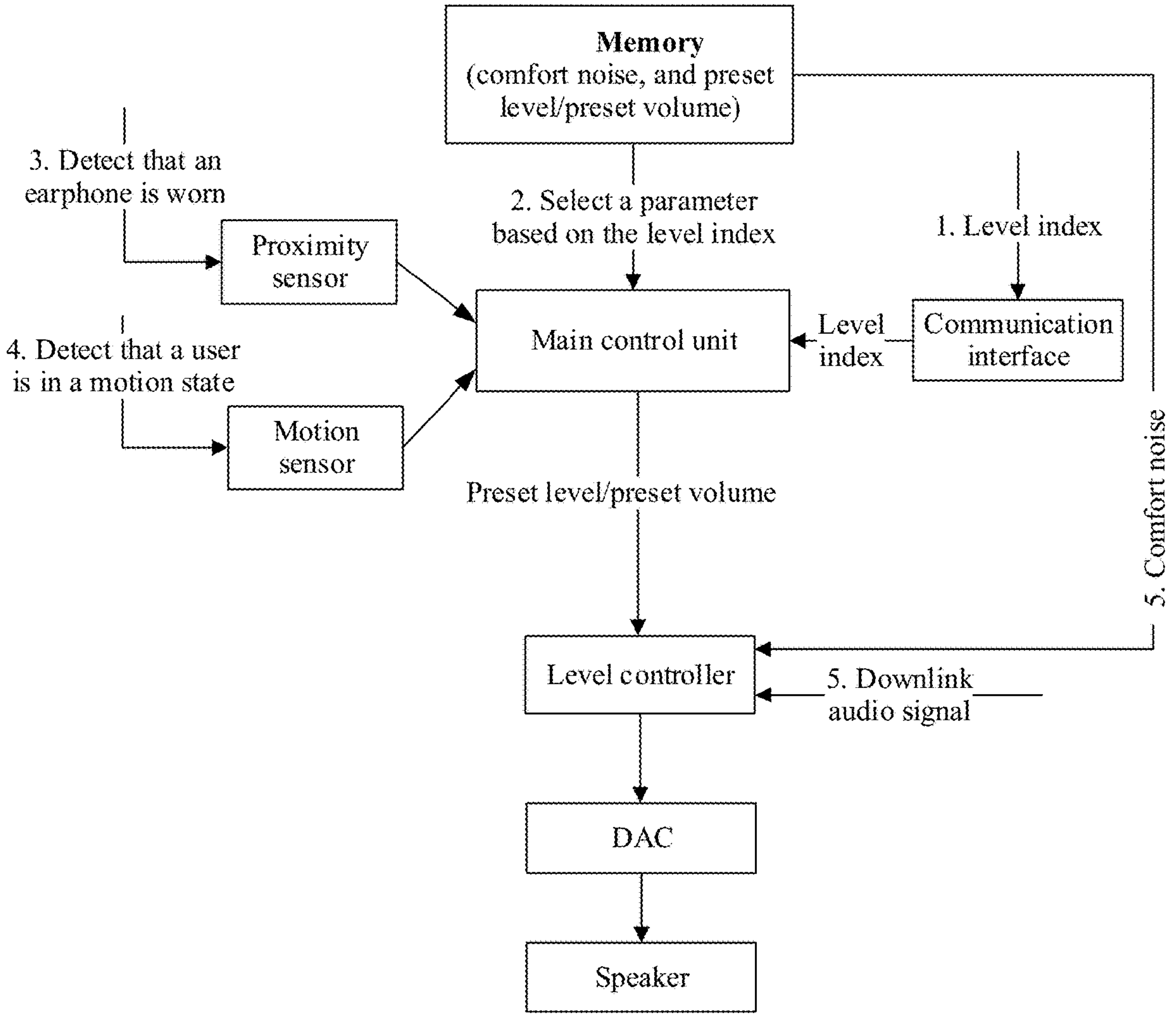
FIG. 20 is a schematic flowchart of another method for reducing or eliminating an occlusion effect of an earphone according to an embodiment of this application.

Based on the structure shown in FIG. 19, the following continues to describe an OR implementation method provided in an embodiment of this application. FIG. 20 is a schematic flowchart of another method for reducing or eliminating an occlusion effect of an earphone according to an embodiment of this application. The method may be applied, for example, to an earphone having a sensor and a speaker. Related descriptions of the method are as follows:

In S1, a communication interface receives a level index used to indicate a degree of occlusion effect elimination (OR). For specific content, refer to the description of S1 in the embodiment in FIG. 15 or the related description in the embodiment in FIG. 16. Details are not described herein again.

In S2, a main control unit determines playing volume of a downlink audio signal based on the level index. In a possible embodiment, the main control unit may further determine a playing level of comfort noise based on the level index. For specific content, refer to the description of S2 in the embodiment in FIG. 15. Details are not described herein again.

In S3, whether the earphone is in a state of being worn by a user may be detected by using a proximity sensor in the earphone. In S4, whether the user wearing the earphone is in a motion state is detected by using a motion sensor in the earphone. There is no necessary sequence between S3 and S4. In other words, S3 may be performed before or after S4, or S3 and S4 may be performed simultaneously.

When the main control unit determines, based on detection results of the proximity sensor and the motion sensor, that the user wears the earphone and is in the motion state, the main control unit may further start an OR procedure. Details are as follows:

In S5, in a possible embodiment, when a downlink audio signal exists, a level controller may further adjust volume of the downlink audio signal based on preset volume corresponding to the level index. The speaker plays an analog signal of the downlink audio signal to the user's auditory canal. In another possible embodiment, when comfort noise exists, the level controller may further increase volume of the comfort noise based on a preset level corresponding to the level index. The speaker plays an analog signal of the comfort noise to the user's auditory canal.

It can be learned that, in this embodiment of this application, when the user moves, the earphone vibrates due to motion of the user, an earphone wire shakes, the user's head turns, or the earphone vibrates due to external collision or friction when the user wearing the earphone moves. The vibration is further transferred to the user's auditory canal. However, in this embodiment of this application, because the volume of the downlink audio signal is increased or the preset-level comfort noise is played, a masking effect can be generated to weaken or completely mask a sound signal in the auditory canal caused by motion of the user. This can also reduce or even eliminate the occlusion effect, eliminate discomfort of the user, and improve user experience.

Figure 21:
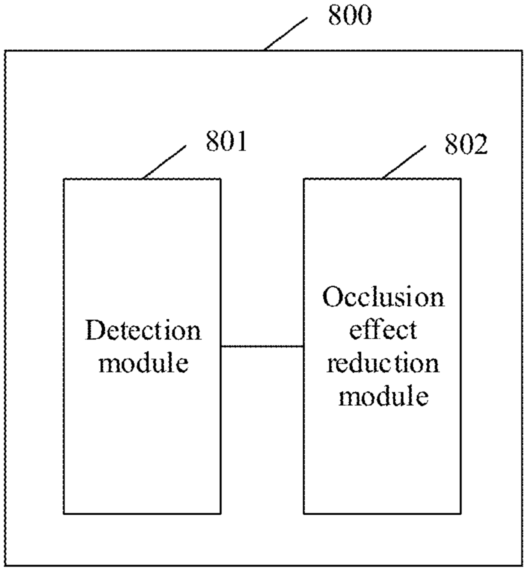
FIG. 21 is a schematic diagram of a structure of an apparatus according to an embodiment of this application.

Based on a same inventive concept, the following describes a schematic diagram of a structure of an apparatus 800 provided in this application. The apparatus 800 may be applied to an earphone. Referring to FIG. 21, the apparatus 800 may include a detection module 801 and an occlusion effect reduction module 802.

The detection module 801 is configured to detect occurrence of at least one of the following events: a user speaks and the user is in a motion state.

The occlusion effect reduction module 802 is configured to trigger at least one of the following operations in response to the at least one event: processing the user's sound signal based on at least one microphone to suppress an occlusion effect of the earphone, and playing an audio by using a speaker, to mask a sound signal in the user's auditory canal.

For specific implementation of each functional module of the apparatus 800, refer to related descriptions in the embodiment in FIG. 4. Details are not described herein again.

Figure 22:
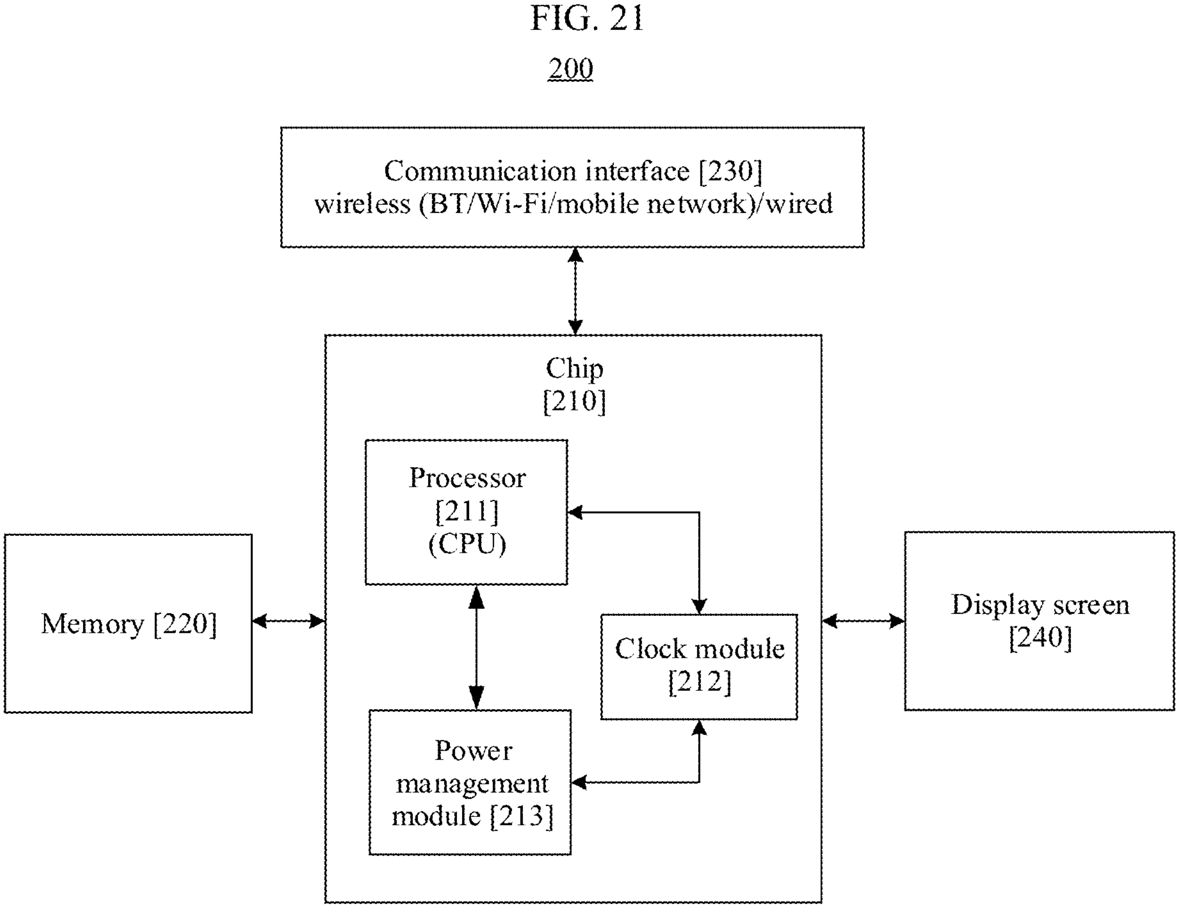
FIG. 22 is a schematic diagram of a structure of a terminal according to an embodiment of this application.

Based on a same inventive concept, the following describes a schematic diagram of a structure of a terminal 200 provided in this application. For example, the terminal 200 may be a mobile terminal such as a smartphone, a tablet computer, or a notebook computer, or may be a smart home device such as a loudspeaker device, a smart television, a smart air conditioner, or a smart refrigerator, or may be a vehicle-mounted device such as an electric bicycle device or an automobile device. Referring to FIG. 22, the terminal 200 may include a chip 210, a memory 220, a communication interface 230, and a display screen 240. Components such as the chip 210, the memory 220, the communication interface 230, and the display screen 240 may communicate with each other over one or more communication buses.

The chip 210 may integrate one or more processors 211, a clock module 212, and a power management module 213. The clock module 212 integrated in the chip 210 is mainly configured to provide a timer required for data transmission and time sequence control for the processor 211, where the timer may implement clock functions for data transmission and time sequence control. The processor 211 may generate an operation control signal based on an instruction operation code and a time sequence signal, to complete control of instruction reading and instruction execution. The power management module 213 integrated in the chip 210 is mainly configured to provide stable and high-precision voltages for the chip 210 and other components of the terminal 200.

The processor 211 may also be referred to as a Central Processing Unit (CPU). The processor 211 may specifically include one or more processing units. For example, the processor 211 may include an Application Processor (AP), a modem processor, a Graphics Processing Unit (GPU), an Image Signal Processor (ISP), a controller, a video codec, a Digital Signal Processor (DSP), a baseband processor, and/or a neural Network Processing Unit (NPU), and the like. Different processing units may be independent components, or may be integrated into one or more processors.

The memory 220 may be connected to the processor 211 by using a bus, or may be coupled to the processor 211, and configured to store various software programs and/or a plurality of groups of instructions. In a specific implementation, the memory 220 may include a high-speed random access memory, and may also include a non-volatile memory, for example, one or more disk storage devices, a flash memory device, or another non-volatile solid-state storage device. The memory 220 may further store a communication program, and the communication program may be used to communicate with an earphone. The memory 220 may further store a user interface program. The user interface program may vividly display content of the application by using a graphical operation interface and display the content by using the display screen 240.

In some embodiments, the terminal 200 may include one or more display screens 240. The display screen 240 specifically includes a touch panel. To be specific, it can detect an input operation of a user (for example, an operation such as tapping, sliding, pressing, or touching performed by the user), and can display interface content. The terminal 200 may implement a display function together with the display screen 240, the Graphics Processing Unit (GPU) and the Application Processor (AP) in the chip 210, and the like. The GPU is a microprocessor used for image processing, and is connected to the display screen 240 and the application processor. The GPU is configured to perform mathematical and geometric computation, and render an image. The display screen 240 is configured to display a control interface currently output by a system. Content of the control interface may include an interface of a running application, a system-level menu, and the like, and may specifically include the following interface elements: an input interface element or control, for example, a button, a text input box, a scroll bar, and a menu; and an output interface element, such as a window or a label. For example, the control interface may be the control interface described in the embodiment in FIG. 6, FIG. 7, or FIG. 16.

The communication interface 230 may be used as a transceiver of the terminal 200, to implement communication interaction between the terminal 200 and the earphone. Specifically, the communication interface 230 is configured to implement wireless (for example, by using Bluetooth, Wi-Fi, or a 2G/3G/4G/5G data network) or wired communication between the terminal 200 and the earphone. For example, the communication interface 230 sends, to the earphone, a level index used to indicate a degree of OR.

In a specific embodiment of this application, the display screen 240 is configured to display an input interface, and provide a control switch component and a level index adjustment component on the input interface; and further configured to receive a switch control signal by using the control switch component, where the switch control signal is a setting signal for enabling or disabling an earphone occlusion effect reduction function by the user; and receive the user's setting of a level index by using the level index adjustment component, where the level index is used to indicate a degree of occlusion effect reduction.

The communication interface 230 is configured to: when the switch control signal is the setting signal for enabling or disabling the earphone occlusion effect reduction function by the user, send, to the earphone, indication information used to indicate the level index, so that the earphone configures at least one of the following parameters corresponding to the level index: a filter coefficient combination, a preset level of comfort noise, or preset volume of a played downlink audio signal, where the filter coefficient combination includes a coefficient of a feedforward filter and a coefficient of a feedback filter; the coefficient of the feedforward filter is used to process a sound signal captured by a reference microphone to obtain a to-be-compensated sound signal and play the to-be-compensated sound signal, to transparently transmit a sound signal propagated in the air to the user's auditory canal; the coefficient of the feedback filter is used to process a sound signal captured by an error microphone to obtain anti-noise signal and play the anti-noise signal, to weaken or cancel the sound signal captured by the error microphone; the preset-level comfort noise is used to mask the sound signal propagated in the user's auditory canal; and the played downlink audio signal with the preset volume is used to mask the sound signal propagated in the user's auditory canal.

Persons of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The storage medium may be a magnetic disk, an optical disc, a Read-Only Memory (ROM), or a Random Access Memory (RAM). What is disclosed above is merely an example embodiment of this application, and certainly is not intended to limit the scope of the claims of this application. A person of ordinary skill in the art may understand that all or some of processes that implement the foregoing embodiments and equivalent modifications made in accordance with the claims of this application shall fall within the scope of this application.

What is claimed is:

1. A method for reducing an occlusion effect of an earphone, wherein the method is applied to the earphone, the earphone having at least one microphone and a speaker, and the method comprises:

detecting an occurrence of at least one of a user speaks or the user is in motion; and triggering, in response to detecting the user speaks or the user is in motion, processing a sound signal based on the at least one microphone to suppress an occlusion effect of the earphone, or playing an audio by using the speaker, to mask a sound signal in the user's auditory canal.

2. The method according to claim 1, wherein the at least one microphone comprises a reference microphone; and processing the sound signal comprises:

capturing, using the reference microphone, the sound signal propagated in air; and processing, using a feedforward filter, the sound signal captured by the reference microphone, to obtain a to-be-compensated sound signal, and playing the to-be-compensated sound signal using the speaker, to transparently transmit the sound signal to the user's auditory canal.

3. The method according to claim 1, wherein the at least one microphone comprises a main microphone; and processing the sound signal comprises:

capturing, using the main microphone, the sound signal propagated in air; and processing the sound signal captured by the main microphone, to obtain a to-be-compensated sound signal, and playing the to-be-compensated sound signal using the speaker, to transparently transmit the sound signal to the user's auditory canal.

4. The method according to claim 1, wherein the at least one microphone comprises an error microphone; and processing the user's sound signal comprises:

capturing, using the error microphone, the sound signal propagated in the user's auditory canal; and processing, using a feedback filter, the sound signal captured by the error microphone, to obtain an anti-noise signal, and playing the anti-noise signal using the speaker, wherein the anti-noise signal is used to weaken or cancel the sound signal captured by the error microphone.

5. The method according to claim 4, wherein the sound signal propagated in the user's auditory canal is caused by the user's voice propagated by bone conduction, friction of the earphone or vibration of an earphone wire due to motion of the user.

6. The method according to claim 1, wherein playing the audio using the speaker comprises:

playing a preset-level comfort noise using the speaker, wherein the comfort noise is used to mask the sound signal propagated in the user's auditory canal; or adjusting a volume of a played downlink audio signal, and playing the downlink audio signal using the speaker, wherein the played downlink audio signal is used to mask the sound signal propagated in the user's auditory canal.

7. The method according to claim 1, wherein when the at least one microphone comprises at least one of a reference microphone, a main microphone, or an error microphone, detecting that the user speaks comprises:

recognizing, using a voice activity detection (VAD) algorithm, the sound signal captured by the microphone, the main microphone; and determining, based on a result of the recognition, that the user speaks.

8. The method according to claim 1, wherein when the at least one microphone comprises a reference microphone and a main microphone, detecting that the user speaks comprises:

performing beamforming using the reference microphone and the main microphone, so that a lobe points to the user's mouth;

recognizing, using a voice activity detection algorithm, sound signals captured by the reference microphone and the main microphone; and determining, based on a result of the recognition, that the user speaks.

9. The method according to claim 1, wherein the at least one microphone comprises a reference microphone and an error microphone;

before triggering the processing of the sound signal the method further comprises:

determining a filter coefficient combination from a filter coefficient library based on a received or determined level index used to indicate a degree of occlusion effect reduction, wherein the filter coefficient combination comprises a coefficient of a feedforward filter and a coefficient of a feedback filter, and the level index corresponds to the filter coefficient combination in the filter coefficient library; and triggering the processing of the sound signal comprises:

capturing, using the reference microphone, the sound signal propagated in air;

processing, using the feedforward filter based on the coefficient of the feedforward filter, the sound signal captured by the reference microphone, to obtain a to-be-compensated sound signal, and playing the to-be-compensated sound signal using the speaker, to transparently transmit the sound signal to the user's auditory canal;

capturing, using the error microphone, the sound signal propagated in the user's auditory canal; and processing, using the feedback filter based on the coefficient of the feedback filter, the sound signal captured by the error microphone, to obtain an anti-noise signal, and playing the anti-noise signal using the speaker, wherein the anti-noise signal is used to weaken or cancel the sound signal captured by the error microphone.

10. The method according to claim 1, wherein before triggering the playing of the audio using the speaker, the method further comprises:

determining a preset level of a comfort noise or determining a preset volume of a played downlink audio signal based on a received or determined level index used to indicate a degree of occlusion effect reduction, wherein the level index used to indicate the degree of occlusion effect reduction corresponds to the preset level or the preset volume; and playing the audio using the speaker comprises:

playing the preset-level comfort noise by using the speaker; or playing the played downlink audio signal with the preset volume using the speaker.

11. An apparatus for reducing an occlusion effect of an earphone, the apparatus comprising:

at least one microphone, a speaker, a non-transitory memory storing instructions, and at least one processor in communication with the memory; wherein the at least one processor configured, upon execution of the instructions, to perform the following steps:

detecting an occurrence of at least one of a user speaks or the user is in motion; and triggering, in response to detecting the user speaks or the user is in motion, processing a sound signal based on the at least one microphone to suppress an occlusion effect of the earphone, or playing an audio using the speaker, to mask a sound signal in the user's auditory canal.

12. The apparatus according to claim 11, wherein the at least one microphone comprises a reference microphone-configured to capture the sound signal propagated in air;

the at least one processor is configured to process, using a feedforward filter, the sound signal captured by the reference microphone, to obtain a to-be-compensated sound signal; and the speaker is configured to play the to-be-compensated sound signal, to transparently transmit the sound signal to the user's auditory canal.

13. The apparatus according to claim 11, wherein the at least one microphone comprises a main microphone configured to capture the sound signal propagated in air;

the at least one processor is configured to process the sound signal captured by the main microphone, to obtain a to-be-compensated sound signal; and the speaker is configured to play the to-be-compensated sound signal, to transparently transmit the sound signal to the user's auditory canal.

14. The apparatus according to claim 11, wherein the at least one microphone comprises an error microphone;

configured to capture a sound signal propagated in the user's auditory canal;

the at least one processor is configured to process, using a feedback filter, the sound signal captured by the error microphone, to obtain an anti-noise signal; and the speaker is configured to play the anti-noise signal, wherein the anti-noise signal is used to weaken or cancel the sound signal captured by the error microphone.

15. The apparatus according to claim 14, wherein the sound signal propagated in the user's auditory canal is caused by the user's sound signal propagated by bone conduction, friction of the earphone or vibration of an earphone wire due to motion of the user.

16. The apparatus according to claim 11, wherein the at least one processor is configured to obtain a preset-level comfort noise; and the speaker is configured to play the preset-level comfort noise, wherein the comfort noise is used to mask the sound signal propagated in the user's auditory canal, or the at least one processor is configured to adjust a volume of a played downlink audio signal; and the speaker is further configured to play the played downlink audio signal, wherein the played downlink audio signal is used to mask the sound signal propagated in the user's auditory canal.

17. The apparatus according to claim 11, wherein the at least one microphone comprises at least a reference microphone, a main microphone, or an error microphone; and the at least one processor is configured to recognize, using a voice activity detection algorithm, the sound signal captured by the at least one microphone; and determine, based on a result of the recognition, that the user speaks.

18. The apparatus according to claim 11, wherein the at least one microphone comprises a reference microphone and a main microphone; and the at least one processor is configured to perform beamforming using the reference microphone and the main microphone, so that a lobe points to the user's mouth;

recognize, using a voice activity detection algorithm, the sound signal captured by the reference microphone and the main microphone; and determine, based on a result of the recognition, that the user speaks.

19. The apparatus according to claim 11, wherein the at least one microphone comprises a reference microphone and an error microphone;

the at least one processor is configured to determine a filter coefficient combination from a filter coefficient library based on a received or determined level index used to indicate a degree of occlusion effect reduction, wherein the filter coefficient combination comprises a coefficient of a feedforward filter and a coefficient of a feedback filter, and the level index corresponds to the filter coefficient combination in the filter coefficient library;

the reference microphone is configured to capture the sound signal propagated in air;

the at least one processor is configured to process, using the feedforward filter based on the coefficient of the feedforward filter, the sound signal captured by the reference microphone, to obtain a to-be-compensated sound signal;

the speaker is configured to play the to-be-compensated sound signal, to transparently transmit the sound signal to the user's auditory canal;

the error microphone is configured to capture the sound signal propagated in the user's auditory canal;

the at least one processor is further configured to process, using the feedback filter based on the coefficient of the feedback filter, the sound signal captured by the error microphone, to obtain an anti-noise signal; and the speaker is configured to play the anti-noise signal, wherein the anti-noise signal is used to weaken or cancel the sound signal captured by the error microphone.

20. The apparatus according to claim 19, wherein the at least one processor is configured to determine a preset level of a comfort noise or determine a preset volume of a played downlink audio signal based on a received or determined level index used to indicate a degree of occlusion effect reduction, wherein the level index corresponds to the preset level or the preset volume; and the speaker is configured to play the preset-level comfort noise, wherein the comfort noise is used to mask the sound signal propagated in the user's auditory canal; or play the played downlink audio signal with the preset volume, wherein the played downlink audio signal is used to mask the sound signal propagated in the user's auditory canal.

* * * * *